United States Patent
Nishikawa et al.

(10) Patent No.: US 9,312,913 B2
(45) Date of Patent: Apr. 12, 2016

(54) ECHO CANCELLATION APPARATUS, ECHO CANCELLATION METHOD AND COMMUNICATIONS APPARATUS

(71) Applicant: Panasonic Corporation, Osaka (JP)

(72) Inventors: Tsuyoki Nishikawa, Osaka (JP); Hiroki Furukawa, Osaka (JP); Takeo Kanamori, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 79 days.

(21) Appl. No.: 14/110,938

(22) PCT Filed: Feb. 7, 2013

(86) PCT No.: PCT/JP2013/000672
§ 371 (c)(1),
(2) Date: Oct. 10, 2013

(87) PCT Pub. No.: WO2013/121749
PCT Pub. Date: Aug. 22, 2013

(65) Prior Publication Data
US 2014/0056423 A1 Feb. 27, 2014

(30) Foreign Application Priority Data
Feb. 17, 2012 (JP) ................................ 2012-033272

(51) Int. Cl.
*H04B 3/23* (2006.01)
*H04R 3/02* (2006.01)
(Continued)

(52) U.S. Cl.
CPC ................. *H04B 3/23* (2013.01); *H04M 9/082* (2013.01); *H04R 3/02* (2013.01); *H04R 27/00* (2013.01)

(58) Field of Classification Search
None
See application file for complete search history.

(56) References Cited

U.S. PATENT DOCUMENTS 5,887,059 A * 3/1999 Xie et al. ................. 379/406.09
6,278,744 B1 * 8/2001 Olafsson et al. ............... 375/296
(Continued)

FOREIGN PATENT DOCUMENTS

JP 2004-048253 2/2004
JP 3870861 1/2007
(Continued)

OTHER PUBLICATIONS

International Search Report issued May 7, 2013 in International (PCT) Application No. PCT/JP2013/000672.

*Primary Examiner* — Fan Tsang
*Assistant Examiner* — Jeffrey Lytle
(74) *Attorney, Agent, or Firm* — Wenderoth, Lind & Ponack, L.L.P.

(57) ABSTRACT

An echo cancellation apparatus cancels an echo signal included in a second speech signal including the echo signal of a first speech signal, and includes: a first echo replica generating unit generating a first echo replica by processing the first speech signal through a filter whose characteristic is equalized with a acoustic transfer function of amplified sound; a first echo cancelling unit generating and providing a first echo-cancelled signal by subtracting from the second speech signal the first echo replica generated by the first echo replica generating unit; and a filter updating unit generating a nonlinear-converted echo-cancelled signal by performing nonlinear conversion on the first echo-cancelled signal generated by the first echo cancelling unit, and updating the filter characteristic thereby equalizing the filter characteristic with the acoustic transfer function, using the nonlinear-converted echo-cancelled signal, the first speech signal, and a norm of the first speech signal.

13 Claims, 14 Drawing Sheets

(51) Int. Cl.
*H04M 9/08* (2006.01)
*H04R 27/00* (2006.01)

(56) References Cited

U.S. PATENT DOCUMENTS

| | | | |
|---|---|---|---|
| 7,672,445 B1* | 3/2010 | Zhang et al. | 379/406.01 |
| 2008/0085009 A1* | 4/2008 | Merks et al. | 381/66 |
| 2008/0175375 A1* | 7/2008 | Ishiguro et al. | 379/406.08 |
| 2011/0124380 A1* | 5/2011 | Wang | 455/570 |
| 2012/0072210 A1 | 3/2012 | Suzuki et al. | |

FOREIGN PATENT DOCUMENTS

| | | |
|---|---|---|
| JP | 2007-235848 | 9/2007 |
| JP | 2008-516545 | 5/2008 |
| JP | 2010-226629 | 10/2010 |
| WO | 2006/040734 | 4/2006 |

* cited by examiner

ECHO CANCELLATION APPARATUS, ECHO CANCELLATION METHOD AND COMMUNICATIONS APPARATUS

TECHNICAL FIELD

The present invention relates to echo cancellation apparatuses, echo cancellation methods, and communications apparatuses. In particular, the present invention relates to an echo cancellation apparatus, an echo cancellation method, and a communications apparatus for generating and providing an echo-cancelled signal in which an echo signal is cancelled, the echo signal being (i) generated when a amplified sound of a first speech signal is received and (ii) included in a second speech signal, and the echo-cancelled signal being generated of the second speech signal with the echo signal cancelled.

BACKGROUND ART

There is a disclosed technique to apply an independent component analysis for equalizing a filter characteristic with an acoustic transfer function of an echo even during doubletalk in which a microphone signal simultaneously includes the echo and the speech of a near-end user, and appropriately cancelling the echo (see Patent Literature 1, for example).

There is another disclosed technique to apply the normalized least mean square (NLMS) based on a nonlinear function including a dead zone and an over-corrected zone (see Patent Literature 2, for example).

CITATION LIST

Patent Literature

[PTL 1] Japanese Unexamined Patent Application Publication No. 2004-048253
[PTL 2] Japanese Unexamined Patent Application Publication No. 2010-226629

SUMMARY OF INVENTION

Technical Problem

The above conventional echo cancellation apparatuses have a problem in that, during doubletalk in which a microphone signal simultaneously includes an echo and the speech of a near-end user, the apparatuses cannot equalize the filter characteristics with the echo acoustic transfer functions.

The present invention is conceived in view of the above problem and aims to provide an echo cancellation method and the like for canceling an echo during doubletalk.

Solution to Problem

An echo cancellation apparatus according to an aspect of the present invention generates and provides an echo-cancelled signal in which an echo signal is cancelled, the echo signal being (i) generated when a amplified sound of a first speech signal is received and (ii) included in a second speech signal, and the echo-cancelled signal being generated of the second speech signal with the echo signal cancelled. The echo cancellation apparatus includes: a first echo replica generating unit which generates a first echo replica by processing the first speech signal through a filter whose characteristic is equalized with a acoustic transfer function, of the amplified sound, found until the amplified sound is received; a first echo cancelling unit which generates a first echo-cancelled signal by subtracting from the second speech signal the first echo replica generated by the first echo replica generating unit, and provide the first echo-cancelled signal; and a filter updating unit which (i) generates a nonlinear-converted echo-cancelled signal by performing nonlinear conversion on the first echo-cancelled signal generated by the first echo cancelling unit, and (ii) updates the filter characteristic thereby equalizing the filter characteristic with the acoustic transfer function, using the nonlinear-converted echo-cancelled signal, the first speech signal, and a norm of the first speech signal.

The general and specific aspect may be implemented using a system, a method, an integrated circuit, a computer program, or a computer-readable recording medium such as a CD-ROM, or any combination of systems, methods, integrated circuits, computer programs, or computer-readable recording media.

Advantageous Effects of Invention

The echo cancellation apparatus according to an implementation of the present invention successfully cancels echo in doubletalk.

DESCRIPTION OF EMBODIMENTS

Figure 1:
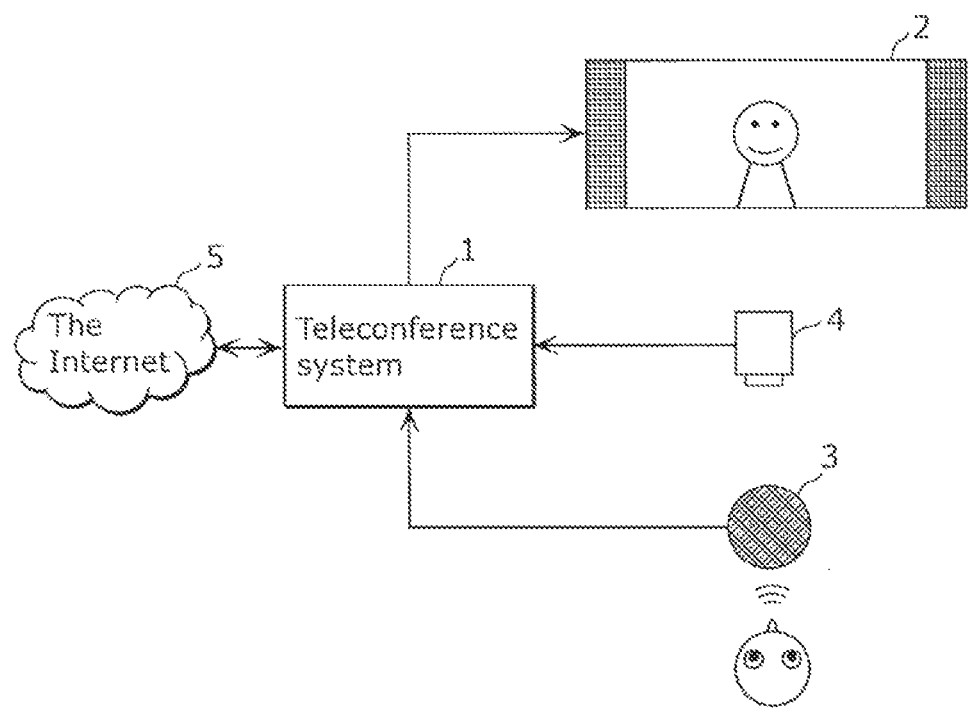
FIG. 1 shows an overall block diagram of a teleconference system according to Embodiment 1.

[Underlying Knowledge Forming Basis of the Present Invention]

In relation to the echo cancellation apparatuses disclosed in the Background Art section, the inventors have found the problems below.

Teleconference systems are used for holding video conferences. In a video conference organized using a teleconference system, the near-end teleconference system apparatus (hereinafter simply referred to as apparatus) and the far-end apparatus are mutually transmit and receive video and speech via a communications line. The near-end apparatus transmits, to the far end, video captured by a near-end camera and speech received by a near-end microphone. Moreover, the near-end apparatus receives video captured by a far-end camera and shows the video on a near-end display, as well as receives speech received by a far-end microphone and amplifies the speech by a near-end speaker. Hence the teleconference system handles communication through mutual transmission and reception of video and speech. In the teleconference system, the near-end microphone receives not only the speech of a near-end user but also the far-end speech sent from the far-end apparatus and amplified by the near-end speaker. When the far-end speech is amplified by the near-end speaker and received by the near-end microphone, the received sound is referred to as acoustic echo (hereinafter simply referred to as echo). In the case where the speech of the near-end user is transmitted with the echo un-cancelled when the echo is to appear, the far-end speaker inevitably amplifies the speech of the far-end user himself or herself with a time lag. Such an echo disturbs communication. Echo cancellation by an echo cancellation apparatus will successfully achieve smooth communication.

The echo cancellation apparatus uses a filter, which simulates an echo acoustic transfer function that appears from a speaker to a microphone, to convolve a speaker signal to generate an echo replica. The echo canceling apparatus then subtracts the echo replica from a microphone signal. Moreover, the echo cancellation apparatus uses an echo-cancelled signal (a signal whose echo is cancelled) and the speaker signal to update the filter characteristic so that the updated filter characteristic is equalized with the echo acoustic transfer function.

Well-known techniques to update a filter characteristic include ones based on the least mean-square error (LMS) and on the normalized least mean square error (NLMS). These techniques allow a filter to be updated so that the echo echo-cancelled signal becomes zero, on the assumption that the microphone signal includes an echo alone (singletalk).

In the case where these techniques are used during doubletalk in which a microphone signal simultaneously includes the echo and the speech of a near-end user, the filter characteristic is not necessarily updated to be closer to the echo acoustic transfer function. In some cases, the echo could become larger when filter characteristics are updated. Hence, a conventional echo cancellation apparatus could fail to generate an appropriate echo replica. As a result, the echo cancellation apparatus would end in an increase in the echo.

There is a disclosed technique to apply the independent component analysis for equalizing a filter characteristic with an echo acoustic transfer function even during doubletalk, and appropriately cancelling the echo (see PTL 1, for example). There is another disclosed technique to apply the NLMS based on a nonlinear function including a dead zone and an over-corrected zone (see PTL 2, for example).

The above conventional echo cancellation apparatuses have a problem in that, during doubletalk in which a microphone signal simultaneously includes the speech of a near-end user and an echo, the apparatuses cannot equalize the filter characteristics with the echo acoustic transfer functions. This is because the conventional echo cancellation apparatuses execute an operation to decrease the level of a microphone signal on the assumption that the microphone signal includes an echo signal alone. In the case of the doubletalk when the microphone speech is mixed with the user speech, however, the operation cannot appropriately update the filter characteristic. Sometimes, the operation would end in an increase in the echo.

Hence, in the doubletalk as well as in singletalk, the filter characteristic has to be equalized with the echo acoustic transfer function in order to cancel the echo.

In order to address the above problem, PTL 1 applies the independent component analysis. In this technique, however, the update of the filter depends on the level of a speaker signal. Hence, a momentarily-changing level of a speaker signal would lead to a decrease in the convergence rate of the filter characteristic to the echo acoustic transfer function. The decrease in the convergence rate means that the echo remains until the convergence ends. Thus, the echo is far from being cancelled while the users continue a conversation. Consequently, the technique disclosed in PTL 1 fails to solve the above problem.

In contrast, PTL 2 applies the normalized least mean square (NLMS) based on a nonlinear function including a dead zone and an over-corrected zone in order to address the problem. The technique achieves an improvement in convergence rate compared with a conventional NLMS. PTL 2, however, fails to perform appropriate normalization in updating a filter. In addition, a pseudo echo generated when the filter is updated depends only on the loudness of a user's voice. Hence, in the filter update by the conventional NLMS, the filter is not appropriately updated for equalizing the filter characteristic with the echo acoustic transfer function during doubletalk. Consequently, the technique disclosed in PTL 2 fails to solve the above problem.

The present invention is conceived in view of the above problems and aims to provide an echo canceling method and the like for canceling an echo during doubletalk. More specifically, the present invention aims to provide an echo cancellation method and the like for canceling an echo during the doubletalk, as well as singletalk, by equalizing a filter characteristic with an echo acoustic transfer function.

An echo cancellation apparatus according to an implementation of the present invention generates and provides an echo-cancelled signal in which an echo signal is cancelled, the echo signal being (i) generated when a amplified sound of a first speech signal is received and (ii) included in a second speech signal, and the echo-cancelled signal being generated of the second speech signal with the echo signal cancelled. The echo cancellation apparatus includes: a first echo replica generating unit which generates a first echo replica by processing the first speech signal through a filter whose characteristic is equalized with a acoustic transfer function, of the amplified sound, found until the amplified sound is received; a first echo cancelling unit which generates a first echo-cancelled signal by subtracting from the second speech signal the first echo replica generated by the first echo replica generating unit, and provide the first echo-cancelled signal; and a filter updating unit which (i) generates a nonlinear-converted echo-cancelled signal by performing nonlinear conversion on the first echo-cancelled signal generated by the first echo cancelling unit, and (ii) updates the filter characteristic thereby equalizing the filter characteristic with the acoustic transfer function, using the nonlinear-converted echo-cancelled signal, the first speech signal, and a norm of the first speech signal.

As described above, the echo cancellation apparatus can calculate an amount of filter coefficients update which depends on (i) a first speech signal (speaker signal) normalized by a norm and (ii) a second speech signal (microphone signal) nonlinearly converted. An echo replica, generated by a calculation using the first speech signal and a filter which is updated based on the amount of filter coefficients update, is provided to have the amplitude of the first power dimension of the first speech signal. Thus, in singletalk and doubletalk, the filter characteristic can be stably equalized with the echo acoustic transfer function. Hence, in doubletalk as well as in singletalk, the filter characteristic can be equalized with the echo acoustic transfer function, and the echo signal can be cancelled.

The filter updating unit may update the filter characteristic, using a ratio of the first speech signal to the norm of the first speech signal, and the nonlinear-converted echo-cancelled signal.

The filter updating unit may update the filter characteristic, by adding, to the filter characteristic before update, a product of the ratio of the first speech signal to the norm of the first speech signal, the nonlinear-converted echo-cancelled signal, and a predetermined coefficient.

Hence, the echo cancellation apparatus can calculate an amount of filter coefficients update which depends on a relative change amount with respect to an average value of the first speech signal and a nonlinearly-converted second speech signal. An echo replica, generated by a calculation using the first speech signal and a filter which is updated based on the amount of filter coefficients update, is provided to have the amplitude of the first power dimension of the first speech signal. Thus, in singletalk and doubletalk, the filter characteristic can be stably equalized with the echo acoustic transfer function. Hence, in doubletalk as well as in singletalk, the filter characteristic can be equalized with the echo acoustic transfer function, and the echo signal can be cancelled.

The filter updating unit may perform the nonlinear conversion, using a sign function which takes +1 when the first echo-cancelled signal is positive, −1 when the first echo-cancelled signal is negative, and 0 when the first echo-cancelled signal is zero.

Thanks to the feature, the echo cancellation apparatus can obtain a value which corresponds to a sign to be used for a calculation for changing the level of the echo-cancelled signal closer to zero.

The echo cancellation apparatus may further includes: a second echo replica generating unit which generates a second echo replica, using the norm of the first speech signal and the nonlinear-converted echo-cancelled signal; and a second echo cancelling unit which generates a second echo-cancelled signal by subtracting from the first echo-cancelled signal the second echo replica generated by the second echo replica generating unit, and provides the second echo-cancelled signal.

Thanks to the feature, the echo cancellation apparatus uses the norm of a speaker signal, a nonlinear-converted echo-cancelled signal, and the first echo-cancelled signal, and successfully generates, with a less amount of operations, the second echo replica for cancelling a residual echo in an echo-cancelled signal. Hence, in doubletalk as well as in singletalk, the filter characteristic can be equalized with the echo acoustic transfer function, and the echo signal can be cancelled more precisely.

The echo cancellation apparatus may further includes: a second echo replica generating unit which generates a second echo replica, using the norm of the first speech signal, the nonlinear-converted echo-cancelled signal, and the first speech signal; and; and a second echo cancelling unit which generates a second echo-cancelled signal by subtracting from the first echo-cancelled signal the second echo replica generated by the second echo replica generating unit, and provide the second echo-cancelled signal.

Thanks to the feature, the echo cancellation apparatus uses a speaker signal, the norm of a speaker signal, a nonlinear-converted echo-cancelled signal, and the first echo-cancelled signal, and successfully generates, with a less amount of operations, the second echo replica for cancelling a residual echo in an echo-cancelled signal. Hence, in doubletalk as well as in singletalk, the filter characteristic can be equalized with the echo acoustic transfer function, and the echo signal can be cancelled more precisely.

The echo cancellation apparatus may include: a selecting unit which provides (i) the second echo-cancelled signal as a new second echo-cancelled signal in the case where a level of the second echo-cancelled signal is lower than a level of the first echo-cancelled signal, and (ii) the first echo-cancelled signal as the new second echo-cancelled signal in the case where the level of the second echo-cancelled signal is higher than the level of the first echo-cancelled signal.

Thanks to the above feature, the echo cancellation apparatus can select as an output from the echo cancellation apparatus one of the first echo-cancelled signal and the second echo-cancelled signal whose echo is effectively cancelled. The case when the level of the second echo-cancelled signal is higher than the level of the first echo-cancelled signal is a case when, in an operation intended to cancel an echo included in the first echo-cancelled signal, the included echo inevitably increases in contrast to the original intention. Here, the first echo-cancelled signal is more appropriate as an output from the echo cancellation apparatus.

The filter updating unit may leave the filter characteristic un-updated in the case where the selecting unit provides the first echo-cancelled signal as the new second echo-cancelled signal.

The case when the level of the second echo-cancelled signal is higher than the level of the first echo-cancelled signal is a case when, in a filter update operation intended to generate a first pseudo echo, the filter is updated so that the level of the echo-cancelled signal inevitably increases in contrast to the original intention. In such a case, the filter is left un-updated so that the filter characteristic is stably equalized with the echo acoustic transfer function, and the echo can be cancelled more precisely.

The filter updating unit may calculate, for obtaining the second echo replica, a sum of squares of levels of the first speech signal within a predetermined time period of a past.

Thanks to the above feature, the echo cancellation apparatus can perform high-speed calculations for generating the second echo replica. This is because, in order to calculate the sum of the squares of the levels of the first speech signal at a current time, the echo cancellation apparatus simply subtracts the square value of the least recent time from the sum of the squares of the levels of the first speech signal calculated at the time of the previous processing and then adds the square value of the latest time that is obtained at the current time. Thus, the echo cancellation apparatus can calculate the sum of the squares of speaker signals at a current processing time. Consequently, the number of operations can be reduced when the second echo-cancelled signal is obtained.

An echo cancelling method according to an implementation of the present invention is for generating and providing an echo-cancelled signal in which an echo signal is cancelled, the echo signal being (i) generated when a amplified sound of a first speech signal is received and (ii) included in a second speech signal, and the echo-cancelled signal being generated of the second speech signal with the echo signal cancelled. The echo cancellation method includes: generating a first echo replica by processing the first speech signal through a filter whose characteristic is equalized with a acoustic transfer function, of the amplified sound, found until the amplified sound is received; generating and providing a first echo-cancelled signal by subtracting from the second speech signal the first echo replica generated in the generating the first echo replica; and generating a nonlinear-converted echo-cancelled signal by performing nonlinear conversion on the first echo-cancelled signal generated in the generating and providing, and updating the filter characteristic thereby equalizing the filter characteristic with the acoustic transfer function, using the nonlinear-converted echo-cancelled signal, the first speech signal, and a norm of the first speech signal.

The echo cancelling method may further include: generating a second echo replica, using the norm of the first speech signals, the nonlinear-converted echo-cancelled signal, and the first speech signal; and generating and providing a second echo-cancelled signal by subtracting from the first echo-cancelled signal the second echo replica generated in the generating the second echo replica.

The above features achieve similar effects as the echo cancellation apparatus does so.

A communications apparatus according to an implementation of the present invention includes: an echo cancellation apparatus; a microphone which receives speech in a surrounding, thereby generating a speech signal; a speaker which amplifies speech based on a speech signal; a communications unit configured to transmit a speech signal to a far-end user and receive a speech signal from the far-end user, wherein the echo cancellation apparatus: receives (i) the speech signal received by the communications unit from the far-end user as the first speech signal and (ii) the speech signal generated by the microphone as the second speech signal; and provides one of the first echo-cancelled signal and the second echo-cancelled signal to the communications unit as a speech signal to be transmitted to the far-end user.

The above features achieve similar effects as the echo cancellation apparatus does so.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

It is noted that the embodiments described below show comprehensive and specific examples. The numerical values, shapes, materials, constituent elements, arrangement positions and connecting schemes of the constituent elements, steps, and an order of steps all described in the embodiment are examples, and shall not be defined as they are. Among the constituent elements in the embodiment, those not described in an independent claim representing the most generic concept of the present invention are not necessarily required to achieve the objects of the present invention; however, such constituent elements are introduced to implement a preferable form of the present invention.

It is noted that the same numerical reference is assigned to the same constituent elements, and the detail there of may be omitted.

[Embodiment 1]

Described hereinafter is Embodiment 1 with reference to the drawings. It is noted that Embodiment 1 describes a teleconference system as an example; instead, Embodiment 1 is also applicable to interactive communications systems including speakers and microphones, such as an audio conference system, Web conference services, and a telephone.

Described hereinafter is a structure of the teleconference system according to Embodiment 1, with reference to FIG. 1. FIG. 1 shows an overall block diagram of the teleconference system. As shown in FIG. 1, the overall structure of the teleconference system includes a teleconference system 1, a TV 2, a microphone 3, a camera 4, and the Internet 5.

The teleconference system 1 receives a speech signal (microphone signal) generated by the microphone 3 and a video signal generated by the camera 4, and transmits the speech signal and the video signal to a far-end teleconference system via the Internet 5. Moreover, the teleconference system 1 transmits to the TV 2 a speech signal (speaker signal) and a video signal received from the far-end teleconference system. It is noted that the speaker signal is an example of a first speech signal. Furthermore, the microphone signal is an example of a second speech signal.

The TV 2 receives the video signal and the speech signal (speaker signal), and reproduces an image based on the received video signal and amplifies speech based on the received speech signal (speaker signal).

The microphone 3 receives user's speech and generates the speech signal (microphone signal).

The camera 4 captures a user and generates the video signal.

The Internet 5 is a network to which the teleconference system 1 connected. To the Internet 5, the far-end teleconference system (not shown) is also connected.

The teleconference system 1 bi-directionally transmits and receives video and speech between the near-end user and the far-end user to conduct communication therebetween.

Figure 2:
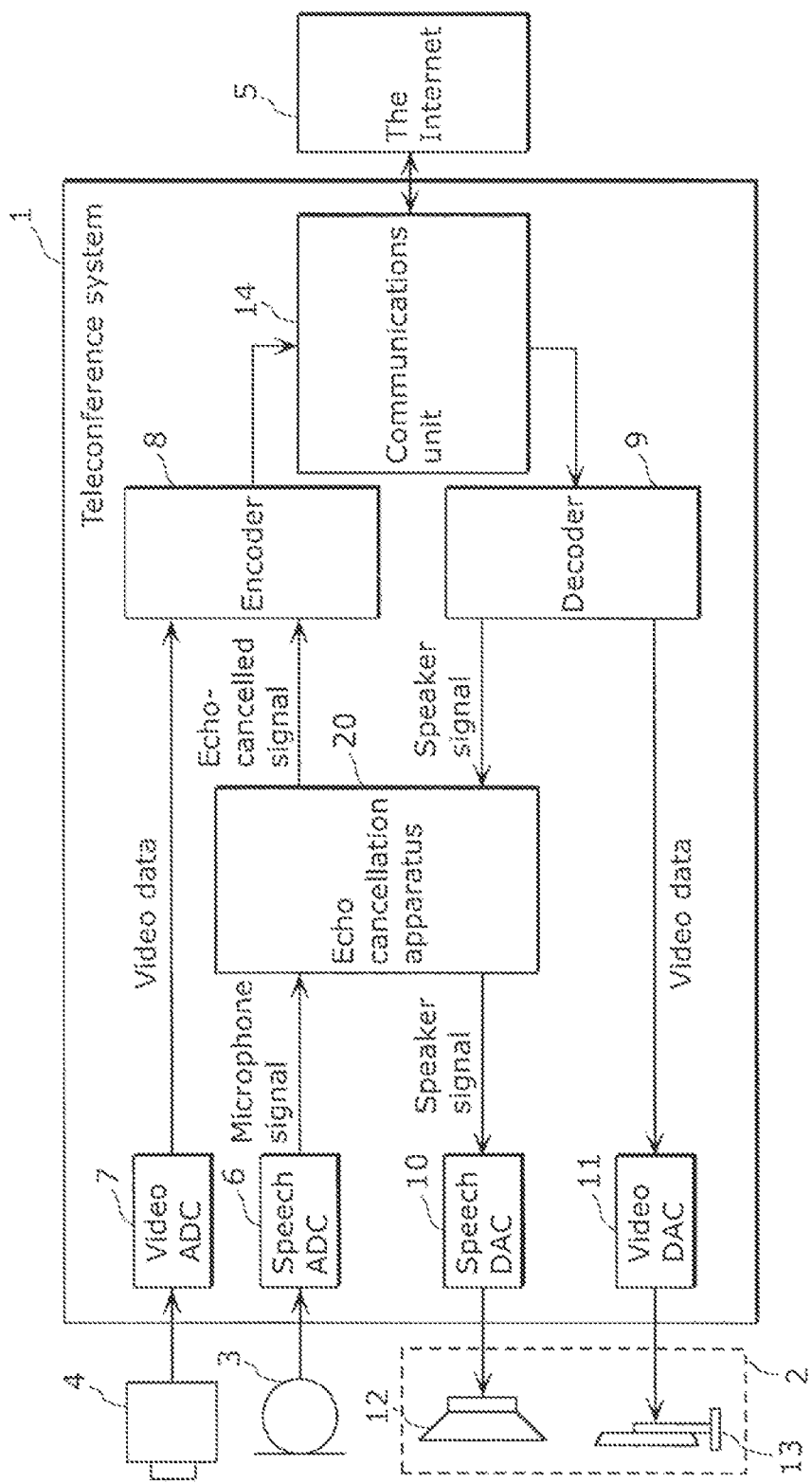
FIG. 2 shows a functional block diagram of the teleconference system according to Embodiment 1.

FIG. 2 shows a functional block diagram of the teleconference system. FIG. 2 specifically illustrates the teleconference system 1 shown in FIG. 1. It is noted that the arrows in FIG. 2 show the directions in which data flows.

As shown in FIG. 2, the teleconference system 1 includes a speech analog-digital converter (ADC) 6, a video ADC 7, an encoder 8, a decoder 9, a speech digital-analog converter (DAC) 10, a video DAC 11, a communications unit 14, and an echo cancellation apparatus 20.

The communications unit 14 transmits and receives video data and speech data.

The decoder 9 decodes the video data and the speech data transmitted from the far-end teleconference system and received by the communications unit 14, and generates a video signal and a digital speaker signal.

The speech DAC 10 converts the digital speaker signal generated by the decoder 9 into an analogue speaker signal. The teleconference system 1 may transmit the digital speaker signal to a speaker 12.

The video DAC 11 converts the digital video signal generated by the decoder 9 into an analogue video signal. The teleconference system 1 may transmit the digital video signal to a display 13.

The video ADC 7 converts an analogue video signal generated by the camera 4 into a digital video signal. The camera 4 may include the video ADC 7 to generate the digital video signal, and transmit the digital video signal to the teleconference system 1.

The ADC 6 converts an analogue microphone signal generated by the microphone 3 into a digital microphone signal. The microphone 3 may include the speech ADC 6 to generate the digital microphone signal, and transmit the digital microphone signal to the teleconference system 1.

The echo cancellation apparatus 20 receives the microphone signal and the speaker signal and provides an echo-cancelled signal.

The encoder 8 encodes the digital video signal provided from the video ADC 7 and the echo-cancelled signal provided from the echo cancellation apparatus 20.

The TV 2 connected to the teleconference system 1 includes the speaker 12 and the display 13. The speaker 12 amplifies the analogue speaker signal provided from the teleconference system 1. The display 13 displays the analogue video signal provided from the teleconference system 1.

It is noted that, hereinafter, the speaker signal, microphone signal, and video signal are to respectively mean the digital speaker signal, digital microphone signal, and digital video signal unless otherwise explained.

It is noted that one speaker and one microphone are illustrated in FIG. 2; instead, two or more speakers and microphones may be used. In such a case, the teleconference system 1 includes an encoder capable of encoding speech signals for the corresponding numbers of microphones, a decoder capable of decoding speech signals for the corresponding numbers of speakers, and an echo cancellation apparatus which generates one or more echo-cancelled signals out of the corresponding numbers of speaker signals and microphone signals. The teleconference system 1 is equipped with speech DACs for the corresponding numbers of speakers in the case where the speech DACs are included therein. The teleconference system 1 is equipped with speech ADCs for the corresponding numbers of microphones in the case where the speech ADCs are included therein.

It is noted that in the case where the TV 2, the microphone 3, and the camera 4 receive and provide digital signals, the video ADC 7, the ADC 6, the speech DAC 10, and the video DAC 11 are not necessary.

Described hereinafter is the echo cancellation apparatus 20. The teleconference system 1 as shown in FIG. 2 amplifies the received far-end speech, using the speaker 12 of the TV 2. Here, the microphone 3 receives the far-end speech amplified by the speaker 12, as well as the speech of the near-end user. When the far-end speech is amplified by the speaker 12 and enters the microphone 3, the speech is an echo. In the case where the speech of the near-end user is transmitted to the far end with the echo un-cancelled when the echo is to appear, the far-end speaker amplifies the speech of the far-end user himself or herself with a time lag. For the far-end user, such an echo disturbs communication. Hence, the echo cancellation apparatus 20 cancels the echo included in the microphone signal received by the microphone 3, and transmits the echo-cancelled signal to the far end. Such a feature implements echo-cancelled and smooth communication.

Described next is an operation of the above teleconference system 1. When a video conference starts between the teleconference system 1 and a far-end teleconference system, a video signal generated by the camera 4 is converted by the video ADC 7 into a digital video signal and sent to the encoder 8. A speech signal generated by the microphone 3 is converted by the ADC 6 into a digital microphone signal. The digital microphone signal has an echo therein cancelled by the echo cancellation apparatus 20 and sent to the encoder 8. Then, the encoder 8 encodes the digital video signal and the digital microphone signal to generate video data and speech data. The video data and the speech data are transmitted from the communications unit 14 to the far-end teleconference system via the Internet 5. Furthermore, video data and speech data received by the communications unit 14 from the far-end teleconference system are decoded by the decoder 9. The decoded video data and speech data are then provided to the TV 2 via the video DAC 11 and the speech DAC 10, respectively. As described above, the bi-directional transmission and reception of the video data and the speech data conducts communication.

Figure 3:
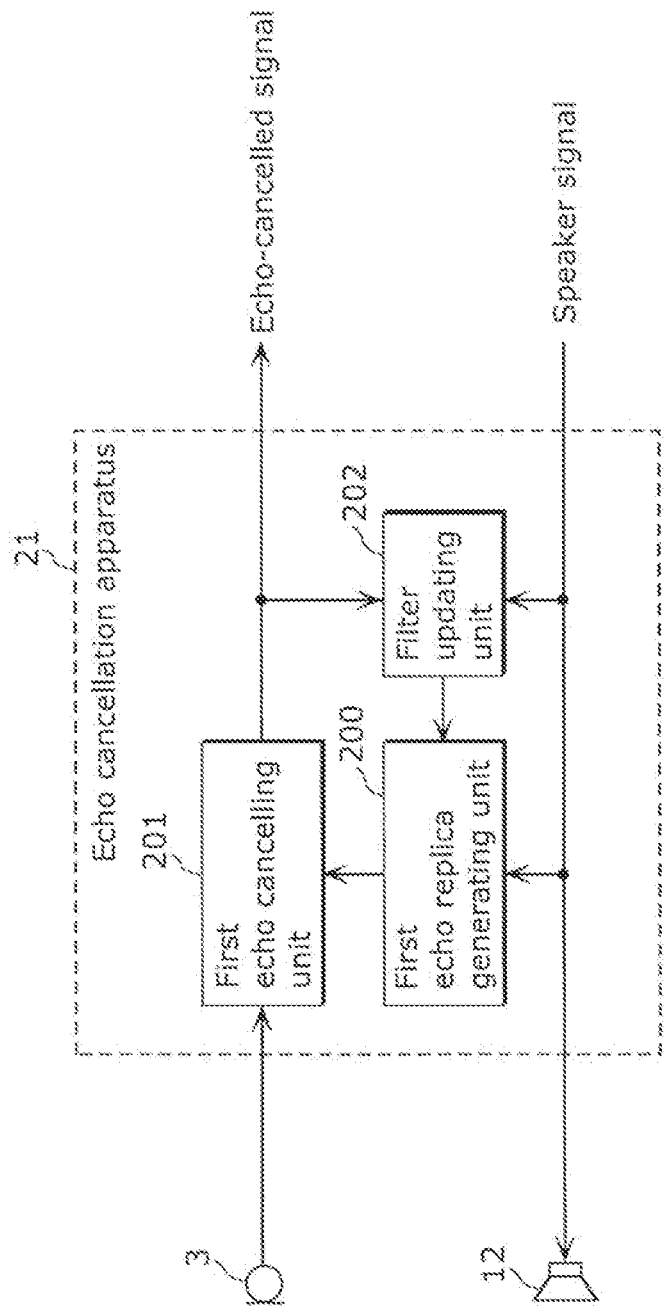
FIG. 3 shows a functional block diagram of an echo cancellation apparatus according to Embodiment 1.

FIG. 3 shows a functional block diagram of an echo cancellation apparatus 21 according to Embodiment 1. The echo cancellation apparatus 21 corresponds to the echo cancellation apparatus 20 in FIG. 2. In FIG. 3, the microphone 3 receives as an echo the speaker signal amplified by the speaker 12, as well as the speech of the near-end user.

The echo cancellation apparatus 21 includes a first echo replica generating unit 200, a first echo cancelling unit 201, and a filter updating unit 202.

The first echo replica generating unit 200 generates an echo replica by performing a convolution operation on a speaker signal and a filter simulating an echo acoustic transfer function.

The first echo cancelling unit 201 generates an echo-cancelled signal by subtracting from a microphone signal the echo replica generated by the first echo replica generating unit 200.

The filter updating unit 202 updates the characteristic of a filter based on the echo-cancelled signal generated by the first echo cancelling unit 201 and the speaker signal.

Figure 4:
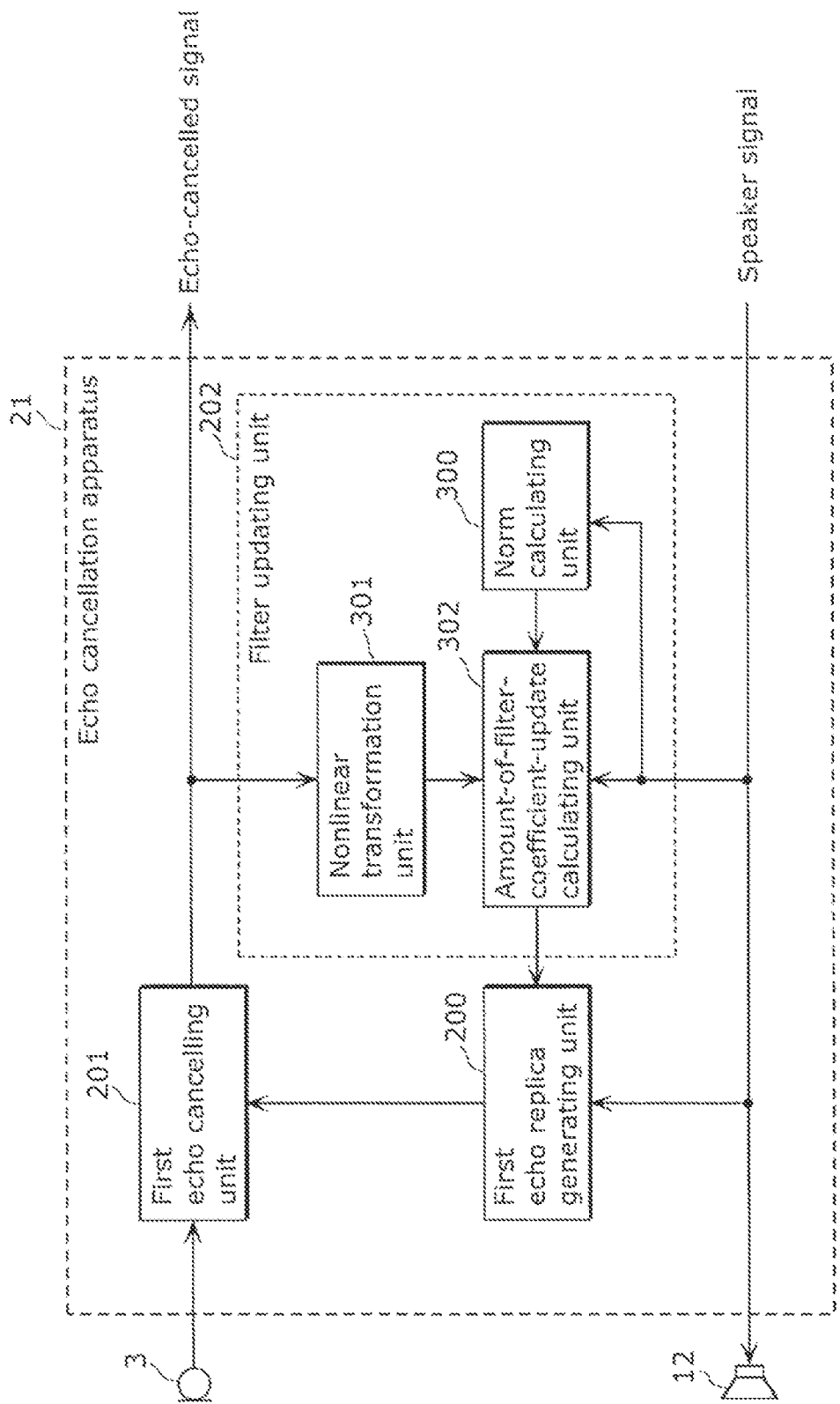
FIG. 4 shows a functional block diagram of a filter updating unit according to Embodiment 1.

FIG. 4 shows a functional block diagram of the filter updating unit 202 according to Embodiment 1. The filter updating unit 202 includes a norm calculating unit 300, a nonlinear transformation unit 301, and an amount-of-filter-coefficient-update calculating unit 302.

The norm calculating unit 300 calculates a norm of a speaker signal. Here, the norm of a speaker signal is the total sum of the levels of a speaker signal within a predetermined time period of the past, and a value indicating a degree of the level of the signals in the time period.

The nonlinear transformation unit 301 performs nonlinear conversion on the echo-cancelled signal to generate a nonlinear-converted echo-cancelled signal.

The amount-of-filter-coefficient-update calculating unit 302 calculates an update amount of a filter characteristic using the norm calculated by the norm calculating unit 300, the nonlinear-converted echo-cancelled signal, and the speaker signal.

Such features contributes to calculating the amount of filter coefficients update based on the norm of the speaker signal, the nonlinear-converted echo-cancelled signal, and the speaker signal, and to updating the filter based on the calculated filter update amount. Consequently, even during double-talk, the filter can be updated to be equalized with an echo acoustic transfer function and an echo replica is appropriately generated, so that an echo can be cancelled properly and constantly.

Figure 5:
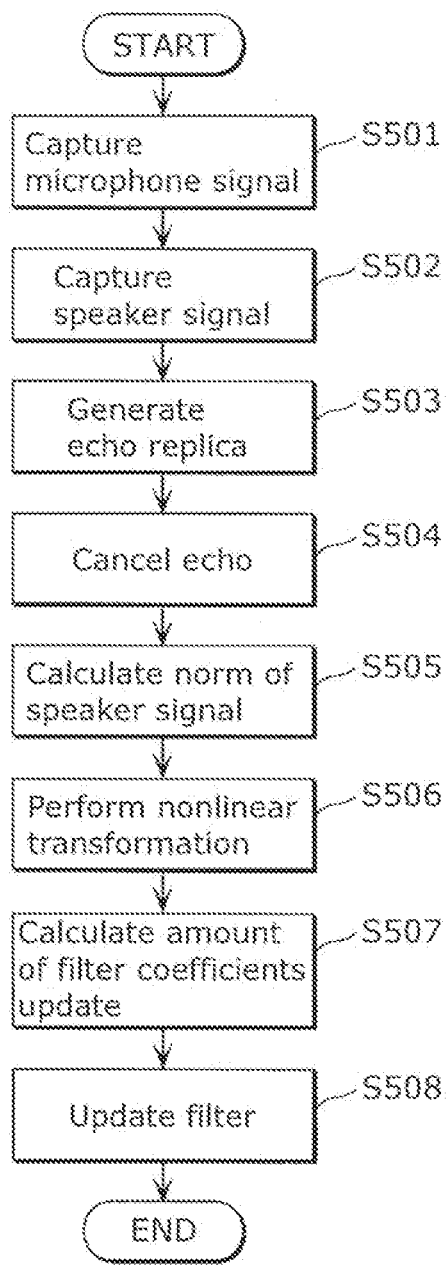
FIG. 5 depicts a flowchart showing how to cancel an echo according to Embodiment 1.

FIG. 5 depicts a flowchart showing how to cancel an echo according to Embodiment 1. The echo cancellation technique according to Embodiment 1 is described with reference to the flowchart and expressions.

In the echo cancellation technique, the echo cancellation apparatus 20 first captures a microphone signal m(t) (Step S501).

Here, t is a time when the microphone signal is digitalized and x(t) is a speaker signal at the time t. The microphone signal m(t) is captured from Expression 1, using user speech s(t) and an echo e(t) (The user speech s(t) includes speech of multiple users or background noise, as well as speech of a single user).

[Math. 1]

$$m(t)=s(t)+e(t) \qquad \text{Expression 1}$$

The echo e(t) is obtained from Expression 2, using an echo acoustic transfer function $h(\tau)$ from the speaker 12 to the microphone 3 and the speaker signal x(t). Here, $\tau$ is a sample number of the filter and L is the length of the echo acoustic transfer function.

[Math. 2]

$$e(t) = \sum_{\tau=0}^{L-1} h(\tau)x(t-\tau) \qquad \text{Expression 2}$$

The echo cancellation apparatus 20 next captures the speaker signal x(t) (Step S502).

The first echo replica generating unit 200 next generates an echo replica z(t) (Step S503). When $w_{t-1}(\tau)$ is a pre-updated filter for simulating the echo acoustic transfer function, the first echo replica generating unit 200 generates the echo replica z(t) from Expression 3. Here, T is the length of the filter.

[Math. 3]

$$z(t) = \sum_{\tau=0}^{T-1} w_{t-1}(\tau)x(t-\tau) \qquad \text{Expression 3}$$

The first echo cancelling unit 201 next cancels the echo included in the microphone signal to generate an echo-cancelled signal o(t) (Step S504). Using Expression 4, the first echo cancelling unit 201 generates the echo-cancelled signal o(t) by subtracting the echo replica z(t) from the microphone signal m(t).

[Math. 4]

$$o(t)=m(t)-z(t) \qquad \text{Expression 4}$$

The norm calculating unit 300 next calculates a norm n(t) of the speaker signal x(t) (Step S505). The norm calculating unit 300 calculates the norm n(t) of the speaker signal x(t) from Expression 5.

[Math. 5]

$$n(t) = \sum_{\tau=0}^{T-1} |x(t-\tau)| \qquad \text{Expression 5}$$

In Expression 5, the norm is a cumulative value of the absolute values of a speaker signal; instead, the norm may be obtained by another calculation technique. For example, the norm may be either a Euclidean norm obtained as the square root of a cumulative value of the squares of speaker signals or a maximum norm obtained as the largest value among the levels of a signal.

The nonlinear transformation unit 301 next generates a nonlinear-converted echo-cancelled signal φ(o(t)) (Step S506). The nonlinear transformation unit 301 performs nonlinear conversion on the echo-cancelled signal o(t) to generate the nonlinear-converted echo-cancelled signal φ(o(t)). It is noted that specific examples of a nonlinear function used for nonlinear conversion is a sign function which takes +1 when a variable to be converted is positive, −1 when a variable to be converted is negative, and 0 when a variable to be converted is zero. Another specific example of nonlinear functions is a hyperbolic tangent tan h(o(t)). In other words, φ(o(t)) is larger than or equal to −1 and smaller than or equal to +1, regardless of the level of a microphone signal.

The amount-of-filter-coefficient-update calculating unit 302 next calculates an amount of filter coefficients update Δw(τ) (Step S506). The amount-of-filter-coefficient-update calculating unit 302 calculates the amount of filter coefficients update Δw(τ) from Expression 6, using the nonlinear-converted echo-cancelled signal φ(o(t)), the speaker signal x(t), and the norm n(t).

[Math. 6]

$$\Delta w(\tau) = \frac{\phi(o(t))x(t-\tau)}{n(t)} \qquad \text{Expression 6}$$

Here, the ratio of the speaker signal x(t) to the norm n(t) indicates a value of a relative change amount from the average value of the levels of speaker signals at a certain time. It is noted that obtaining the ratio of the speaker signal x(t) to the norm n(t) is referred to as normalizing the speaker signal x(t) with the norm.

The amount of filter coefficients update Δw(τ) is obtained using the nonlinear-converted echo-cancelled signal φ(o(t)), the speaker signal x(t), and the norm n(t), and may be obtained by another calculation technique as far as Δw(τ) is dimensionless quantity to be used as an amount of filter coefficients update.

The first echo replica generating unit 200 next updates the filter (Step S507). The first echo replica generating unit 200 calculates an updated filter $w_t(\tau)$ from Expression 7, using the pre-updated $w_{t-1}(\tau)$, the amount of filter coefficients update Δw(τ), and a step gain α. Here, the step gain α is a coefficient for adjusting the update amount. The updated filter is used at a time (t+1) subsequent to the time t.

[Math. 7]

$$w_t(\tau)=w_{t-1}(\tau)+\alpha\Delta w(\tau) \qquad \text{Expression 7}$$

The above sequence of schemes successfully cancels the echo included in a microphone signal, using a filter characteristic, and updates the filter characteristic. The updated filter characteristic is used to cancel an echo at another time.

Described hereinafter is a feature of the echo cancellation technique according to the present invention in comparison with the techniques in PTLs 1 and 2.

The technique disclosed in PTL 1 defines the amount of filter coefficients update Δw(τ) as Expression 8.

[Math. 8]

$$\Delta w(\tau)=\phi(o(t))x(t-\tau) \qquad \text{Expression 8}$$

In Expression 8, a speaker signal x(t−τ) is not normalized with the norm. Hence, the amount of filter coefficients update Δw(τ) changes depending on the level of the speaker signal. When the level of the speaker signal changes momentarily, the change causes a decrease in the convergence rate indicating how fast the filter characteristic becomes closer the echo acoustic transfer function. It is noted that a speech signal of a conversation may be one of the specific examples of a signal whose level changes momentarily.

In contrast, the amount of filter coefficients update Δw(τ) of the updating expression (Expression 6) according to Embodiment 1 is normalized with the norm of the speaker signal, and is independent from the levels of the speaker signal. Hence, even in the case where the levels of the speaker signal change momentarily, the change in the filter characteristic can be made small. The resulting filter characteristic can become closer to the echo acoustic transfer function at a relatively fast rate.

The technique disclosed in PTL 2 defines the amount of filter coefficients update Δw(τ) as Expression 9.

[Math. 9]

$$\Delta w(\tau) = \frac{\phi(o(t))x(t-\tau)}{\sum_{\tau=0}^{T-1} x(t-\tau)^2} \quad \text{Expression 9}$$

In Expression 9, the obtained filter update amount $\Delta w(\tau)$ has the numerator that is the product of a speaker signal and $\phi(o(t))$ that is independent from the level of the speaker signal and the denominator that is the sum of the squares of speaker signals, and $\Delta w(\tau)$ is normalized to be the negative first power dimension of the amplitude of the speaker signal. Hence, $\Delta w(\tau)$ is influenced by the change in the level of the speaker signal, and a correct update amount cannot be calculated. This inevitably leads to a decrease in the convergence rate indicating how fast the filter characteristic becomes closer to the echo acoustic transfer function.

In the case where the amount of filter coefficients update $\Delta w(\tau)$ is not correctly normalized as shown in PTLs 1 and 2, it is obvious that the filter will not be appropriately updated. When a filter is not appropriately updated, a conventional technique could adjust the step gain $\alpha$ by trial and error to reduce the error. The adjustment, however, is made only within a limited range.

In contrast, the filter updating technique according to Embodiment 1 makes it possible to correctly normalize the dimension of an update amount using the norm. As a result, the update for equalizing the filter with the echo acoustic transfer function can be stably and correctly performed even during doubletalk.

Hence, Embodiment 1 makes it possible to cancel an echo by stably equalizing a filter characteristic with an echo acoustic transfer function in doubletalk, as well as in singletalk. The reason is described below.

First, the amount of filter coefficients update $\Delta w(\tau)$ is less dependent on the level of the user speech $s(t)$. As shown in Expression 6, $\Delta w(\tau)$ depends on the nonlinear-converted echo-cancelled signal $\phi(o(t))$. In doubletalk, the user speech $s(t)$ is included in the echo-cancelled signal $o(t)$. Still, nonlinear conversion is performed, and no such case will occur as the amount of filter coefficients update $\Delta w(\tau)$ shows an excessive variation, depending on the level of the user speech $s(t)$.

Secondly, the update amount $\Delta w(\tau)$ of the updated filter $w_t(\tau)$ is successfully less dependent on the level of the speaker signal $x(t)$. As shown in Expression 6, $\Delta w(\tau)$ depends on the normalized $x(t)$—that is $x(t-\tau)/n(t)$. Hence, even in doubletalk as well as singletalk, no such case will occur as the amount of filter coefficients update $\Delta w(\tau)$ shows an excessive variation, depending on the level of the user speech $s(t)$.

Thirdly, the first echo replica generating unit 200 generates an echo replica whose dimension is the same as that of a speaker signal corresponding to the echo replica. Specifically, an echo replica, whose amplitude is the first power dimension, is generated to have the amplitude of the first power dimension of the speaker signal $x(t)$. Here, the echo replica is generated based on the signal having the same dimension. This contributes to generating a stable and correct pseudo echo.

Thanks to the above reasons, the amount of filter coefficients update depends on the relative change amounts of the echo-cancelled signal and the speaker signal, and the echo replica can be expressed in the amplitude of the first power dimension of the speaker signal. Hence, in doubletalk, the filter characteristic can be equalized with the echo acoustic transfer function.

As described above, an echo cancellation apparatus according to an implementation of the present invention can calculate an amount of filter coefficients update which depends on (i) a first speech signal (speaker signal) normalized with a norm and (ii) a second speech signal (microphone signal) nonlinearly converted. An echo replica, generated by a calculation using the first speech signal and a filter which is updated based on the amount of filter coefficients update, is provided to have the amplitude of the first power dimension of the first speech signal. Thus, in singletalk and doubletalk, the filter characteristic is successfully equalized with the echo acoustic transfer function. Hence, in doubletalk as well as in singletalk, the filter characteristic can be equalized with the echo acoustic transfer function, and the echo signal can be cancelled.

Moreover, the echo canceling apparatus can calculate an amount of filter coefficients update which depends on a relative change amount with respect to an average value of first speech signal and a nonlinearly-converted second speech signal. An echo replica, generated by a calculation using the first speech signal and a filter which is updated based on the amount of filter coefficients update, is provided to have the amplitude of the first power dimension of the first speech signal. Thus, in singletalk and doubletalk, the filter characteristic is successfully equalized with the echo acoustic transfer function. Hence, in doubletalk as well as in singletalk, the filter characteristic can be equalized with the echo acoustic transfer function, and the echo signal can be cancelled.

In addition, the echo cancellation apparatus can obtain a value which corresponds to a sign to be used for a calculation for changing the level of the echo-cancelled signal closer to zero.

[Embodiment 2]

Figure 6:
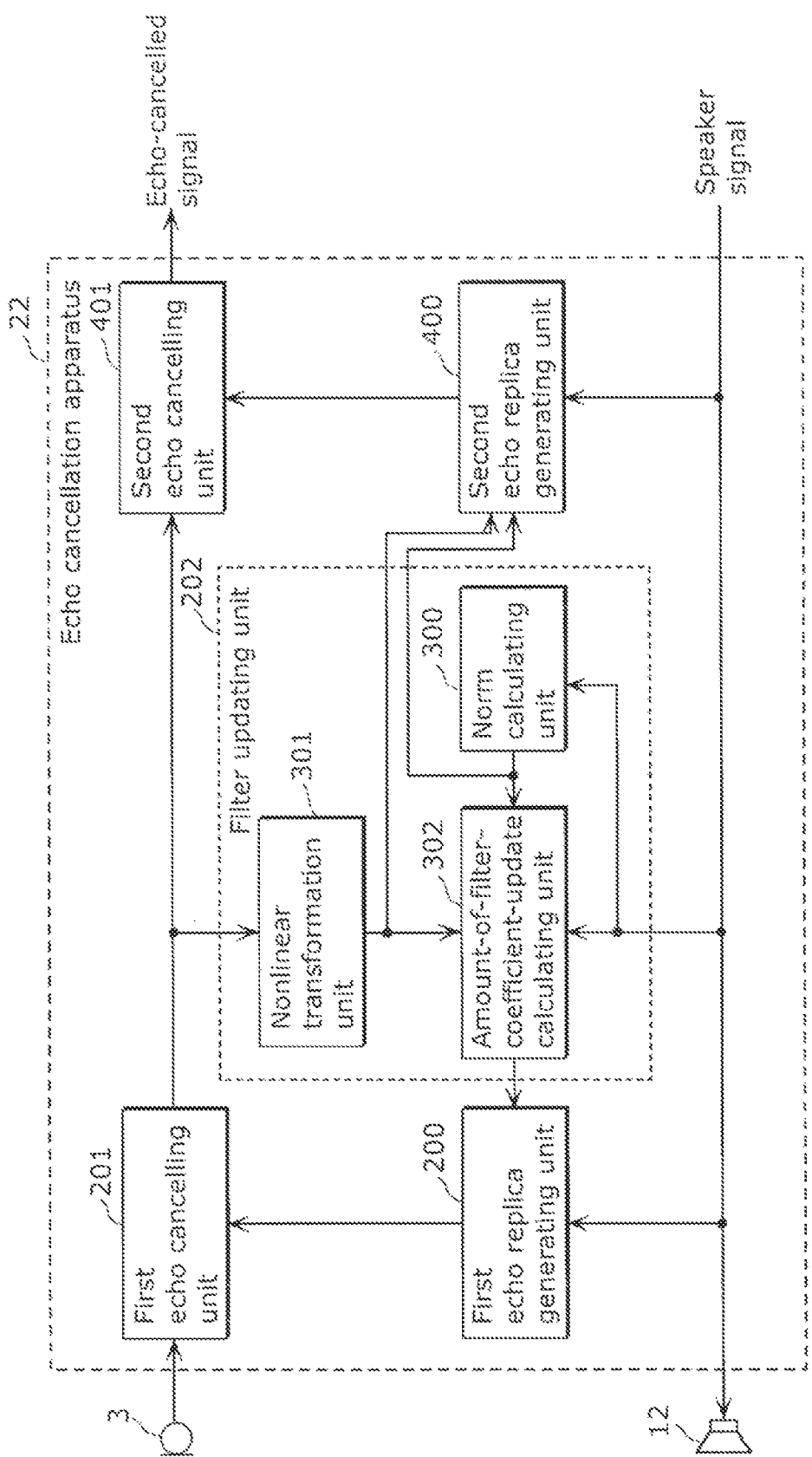
FIG. 6 shows a functional block diagram of an echo cancellation apparatus according to Embodiment 2.

FIG. 6 shows a functional block diagram of an echo cancellation apparatus 22 according to Embodiment 2. The echo cancellation apparatus 22 corresponds to the echo cancellation apparatus 20 in Embodiment 1. In FIG. 6, constituent elements identical to the ones in FIGS. 2 to 4 have the same reference signs as the ones have, and the details thereof shall be omitted.

In FIG. 6, the echo cancellation apparatus 22 includes a second echo replica generating unit 400 and a second echo cancelling unit 401.

The second echo replica generating unit 400 generates a second echo replica, using the above-calculated norm, the above nonlinear-converted echo-cancelled signal, and the above speaker signal.

The second echo cancelling unit 401 generates a second echo-cancelled signal by subtracting the second echo replica from the echo-cancelled signal.

In the above feature, the second echo replica generated by the second echo replica generating unit 400 is subtracted from the echo-cancelled signal according to Embodiment 1 (hereinafter also referred to as first echo-cancelled signal), such that the second echo-cancelled signal is generated. The second echo-cancelled signal is generated by a filter updated based on the amount of filter coefficients update calculated from Expression 6. Compared with the first echo-cancelled signal, the second echo-cancelled signal is less affected by echo.

The echo cancellation technique according to Embodiment 2 is described with reference to the flowchart and expressions.

Figure 7:
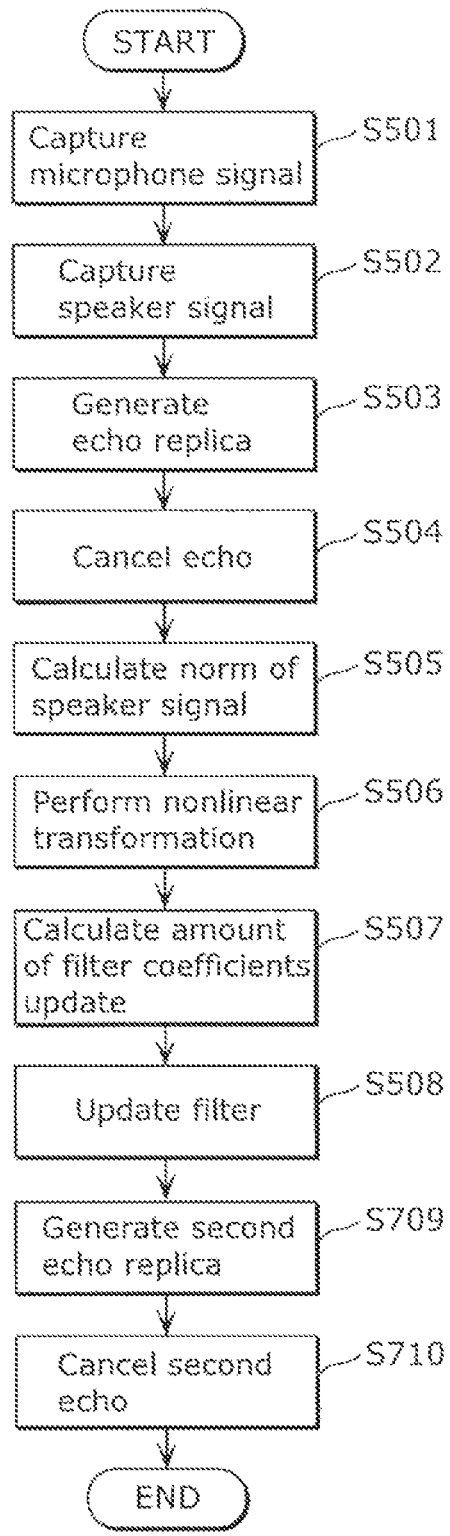
FIG. 7 depicts a flowchart showing how to cancel an echo according to Embodiment 2.

FIG. 7 depicts a flowchart showing how to cancel an echo according to Embodiment 2. The flow in Embodiment 2 differs from the flow in Embodiment 1 in the processing after the filter update (Step S508). Exclusively described hereinafter is the flow of the processing after the filter update (Step S508).

After the filter update (Step S508), the second echo replica generating unit 400 generates the second pseudo echo (Step S709). A second pseudo echo z2(t) is obtained from Expression 10, using the amount of filter coefficients update $\Delta w(\tau)$ and the speaker signal x(t).

[Math. 10]

$$z_2(t) = \alpha \sum_{\tau=0}^{T-1} \Delta w(\tau) x(t-\tau) \qquad \text{Expression 10}$$

In Expression 10, the amount of filter coefficients update $\Delta w(\tau)$ and the speaker signal x(t) are convolved. The convolution involves a significantly large number of convolution operations. Expression 10 is expanded as seen in Expression 11, which eliminates the need for the convolution operations.

[Math. 11]

$$\begin{aligned} z_2(t) &= \alpha \sum_{\tau=0}^{T-1} \Delta w(\tau) x(t-\tau) \\ &= \alpha \sum_{\tau=0}^{T-1} \frac{\phi(o(t)) x(t-\tau)}{n(t)} x(t-\tau) \\ &= \frac{\alpha \phi(o(t))}{n(t)} \sum_{\tau=0}^{T-1} x(t-\tau)^2 \end{aligned} \qquad \text{Expression 11}$$

Expression 11 allows the second echo replica generating unit 400 to generate a second pseudo echo x2(t), using the above-described norm, nonlinearly-converted echo-cancelled signal, and sum of the squares of speaker signals.

With Expression 11, the sum of the squares of speaker signals does not have to be calculated at each time of processing. Instead, a simple operation—the square value of the least recent time is subtracted from the sum of the squares calculated at the time of the previous processing and then the square value of the latest time that is obtained at the current time is added—makes it possible to calculate the sum of the squares of speaker signals at a current processing time. Consequently, the number of operations can be significantly reduced when the second echo-cancelled signal is obtained.

The second echo cancelling unit 401 next cancels an echo included in the first echo-cancelled signal to generate the second echo-cancelled signal (Step S710). The second echo cancelling unit 401 subtracts the second echo replica shown in Expression 11 from the first echo-cancelled signal shown in Expression 4 to generate the second echo-cancelled signal.

[Math. 12]

$$o_2(t) = o(t) - z_2(t) \qquad \text{Expression 12}$$

The second echo cancellation as described above makes it possible to generate an echo-cancelled signal which achieves a more effective echo cancelling result than the first echo-cancelled signal does so.

Described hereinafter is a feature of the echo cancellation technique in an implementation of the present invention in comparison with the techniques in PTLs 1 and 2. Interpretation of the physical meanings of the components of the second pseudo echo makes it possible to understand the features of the echo cancellation technique in an implementation of the present invention. The second pseudo echo corresponds to an amount of change in an echo replica which changes by the filter update.

Suppose the second echo replica is generated, using an amount of filter coefficients update calculated by the echo cancellation technique disclosed in PTL 1. The generated second echo replica is expressed as Expression 13.

[Math. 13]

$$z_2(t) = \alpha \phi(o(t)) \sum_{\tau=0}^{T-1} x(t-\tau)^2 \qquad \text{Expression 13}$$

In PTL 1, the second echo replica (amplitude of the first power dimension) is updated by the power of a speaker signal (amplitude of the second power dimension). The second echo replica is the first power dimension, and its dimension is different from the one for the speaker signal Consequently, this means that the filter cannot be updated correctly.

Suppose the second echo replica is generated, using an amount of filter coefficients update calculated by the echo cancellation technique disclosed in PTL 2. The generated second echo replica is expressed as Expression 14.

[Math. 14]

$$z_2(t) = \alpha \phi(o(t)) \qquad \text{Expression 14}$$

In PTL 2, the second echo replica is updated by a nonlinear-converted echo-cancelled signal (dimensionless). A particular problem of PTL 2 occurs in doubletalk. Expression 14 does not include a speaker signal. In other words, the update amount of an echo replica is determined independently from a speaker signal. Hence the echo replica is updated without the determination to find whether or not an echo signal remains in doubletalk. A typical example is the case where only user speech is present and no echo is found. Essentially, the echo replica does not have to be updated in such a case; however, the second echo replica is updated according to Expression 14. In other words, PTL 2 fails to correctly update the filter with the conventional NLMS in doubletalk. Here, a nonlinear function including a dead zone and an over-corrected zone is used to try an improvement in convergence rate to be equalized with the echo acoustic transfer function. Even though this could cancel the echo to some degree, the resulting echo-cancelled signal is far from optimum.

As described above, PTLs 1 and 2 fail to correctly update the filter in doubletalk and the filter is not equalized with the echo acoustic transfer function.

Described hereinafter is a technique according to Embodiment 2. Expression 11 is deformed and approximated to be Expression 15.

[Math. 15]

$$\begin{aligned} z_2(t) &= \frac{\alpha \phi(o(t))}{n(t)} \sum_{\tau=0}^{T-1} x(t-\tau)^2 \\ &\cong \alpha \phi(o(t)) n(t) \end{aligned} \qquad \text{Expression 15}$$

Expression 15 shows that, in the echo cancellation technique according to Embodiment 2, the second echo replica is generated to have the amplitude of the first power dimension. The norm of a speaker signal has the amplitude of the first power dimension. The nonlinear-converted echo-cancelled signal $\phi(o(t))$ is dimensionless since the signal takes a value of larger than or equal to −1 and smaller than or equal to +1 regardless of the level of a microphone signal. The both sides have the same dimension, and the nonlinear conversion allows the echo-cancelled signal to be less dependent on the level of user speech. Consequently, the technique according to Embodiment 2 can stably generate an echo replica regardless of singletalk or doubletalk.

As described above, the echo cancellation technique according to Embodiment 2 makes it possible to calculate an amount of filter coefficients update due to the independence from a nonlinear-converted echo-cancelled signal and a speaker signal even in doubletalk and is less dependent on the level of the speaker signal. Hence the echo cancellation technique can correctly update a filter so that the filter characteristic is equalized with the echo acoustic transfer function.

As described above, an echo cancellation apparatus according to an implementation of the present invention uses a speaker signal, the norm of a speaker signal, a nonlinear-converted echo-cancelled signal, and the first echo-cancelled signal, and successfully generates, with a less amount of operations, the second echo replica for cancelling a residual echo in an echo-cancelled signal. Hence, in doubletalk as well as in singletalk, the filter characteristic can be equalized with the echo acoustic transfer function, and the echo can be cancelled more precisely.

Moreover, the echo cancellation apparatus can perform high-speed calculations for generating the second echo replica. This is because, in order to calculate the sum of the squares of the levels of a first speech signal at a current time, the echo cancellation apparatus simply subtracts the square value of the least recent time from the sum of the squares of the levels of the first speech signal calculated at the time of the previous processing and then adds the square value of the latest time that is obtained at the current time. Thus, the echo cancellation apparatus can calculate the sum of the squares of speaker signals at a current processing time. Consequently, the second echo-cancelled signal can be obtained with fewer operations.

[Modification of Embodiment 2]

Figure 8:
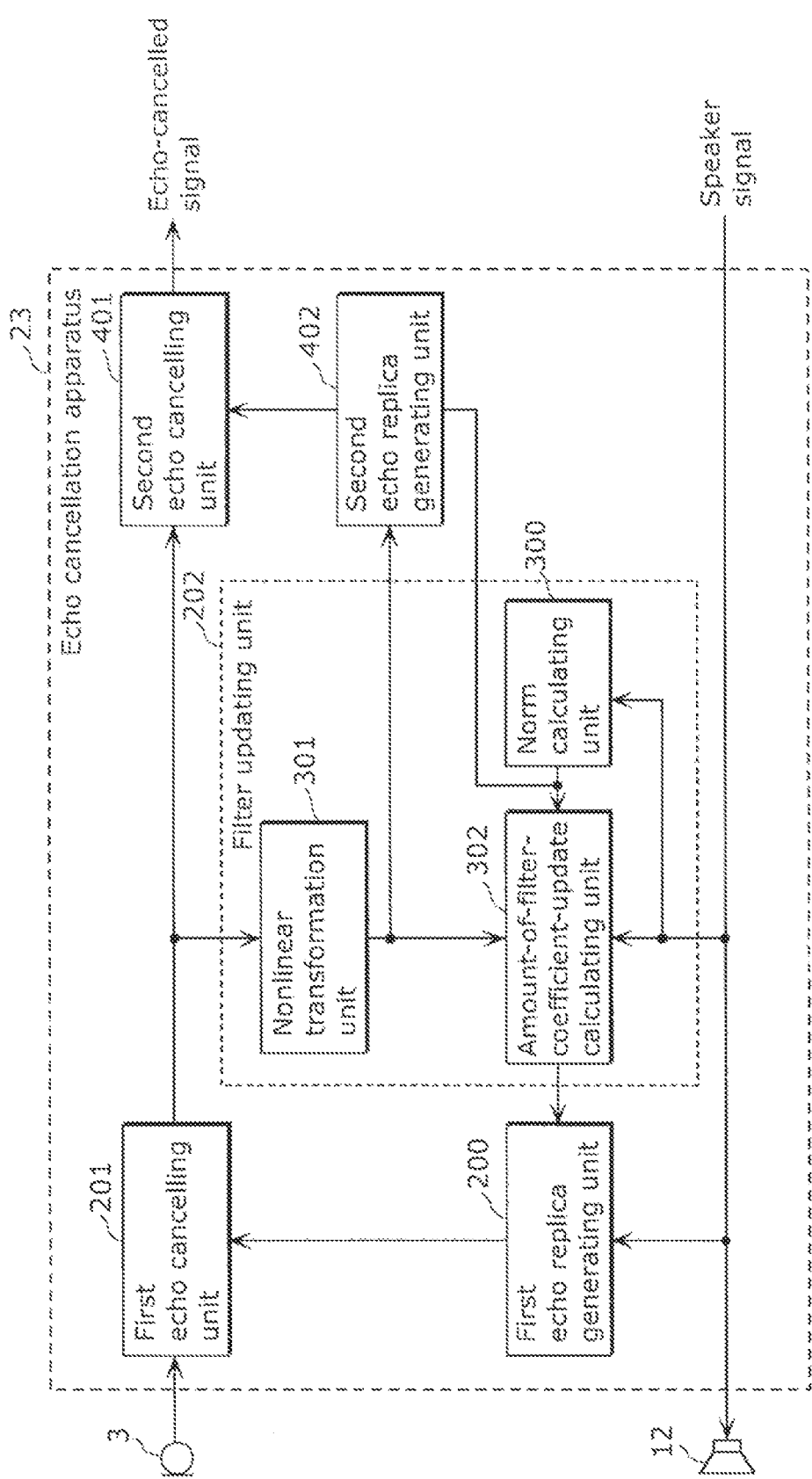
FIG. 8 shows a functional block diagram of an echo cancellation apparatus according Modification in Embodiment 2.

Thanks to the approximation in Expression 15, the echo cancellation apparatus 22 as shown in FIG. 6 can also be formed into an echo cancellation apparatus 23 as shown in FIG. 8. Compared with Embodiment 2, Modification allows the echo cancellation apparatus to handle a less amount of operations. In other words, in Embodiment 2, the second echo-cancelled signal can be obtained, as shown in Expression 11, from the sum of the squares of speaker signals, the norm, and the nonlinear-converted echo-cancelled signal. In Modification, in contrast, the second echo-cancelled signal is obtained from the norm and the nonlinear-converted echo-cancelled signal alone.

FIG. 8 shows a functional block diagram of the echo cancellation apparatus according to Modification in Embodiment 2. A second echo replica generating unit 402 can calculate the second pseudo echo, using the norm calculated by the norm calculating unit 300 and the nonlinear-converted echo-cancelled signal. The second echo replica generating unit 402 successfully generates the second pseudo echo with a less amount of operations.

Thanks to the above feature, the second echo replica generating unit 402 shows an improvement in echo cancelling capability with a very little amount of operations.

As described above, an echo cancellation apparatus according to an implementation of the present invention uses the norm of a speaker signal, a nonlinear-converted echo-cancelled signal, and the first echo-cancelled signal, and successfully generates, with a less amount of operations, the second echo replica for cancelling a residual echo in an echo-cancelled signal. Hence, in doubletalk as well as in singletalk, the filter characteristic can be equalized with the echo acoustic transfer function, and the echo can be cancelled more precisely.

[Embodiment 3]

Figure 9:
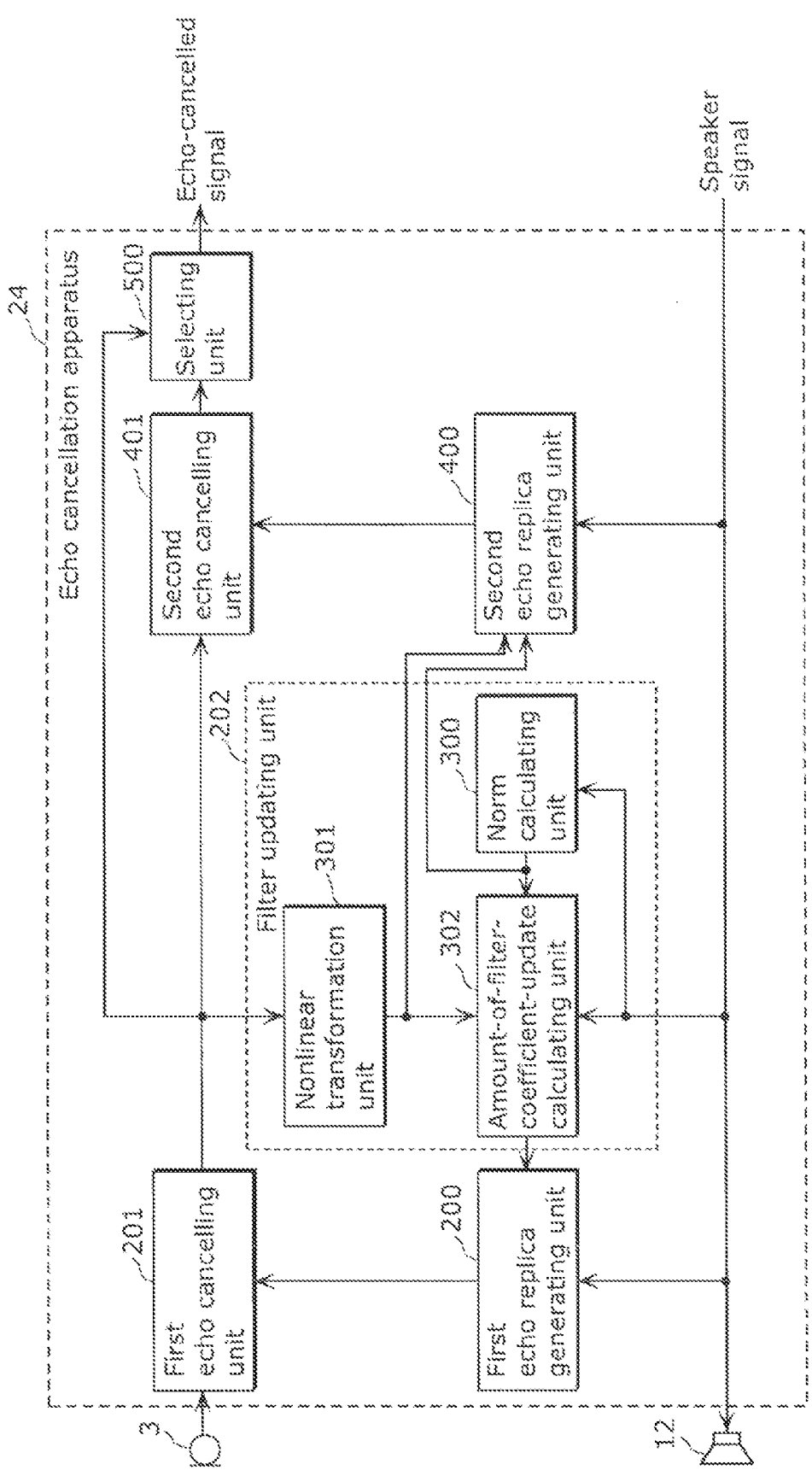
FIG. 9 shows a functional block diagram of an echo cancellation apparatus according to Embodiment 3.

FIG. 9 shows a functional block diagram of an echo cancellation apparatus 24 according to Embodiment 3. The echo cancellation apparatus 24 corresponds to the echo cancellation apparatus 20 in Embodiment 1. In FIG. 9, constituent elements identical to the ones in FIGS. 2 to 4 and 6 have the same reference signs as the ones have, and the details thereof shall be omitted.

The echo cancellation apparatus 24 in FIG. 9 includes a selecting unit 500.

The selecting unit 500 compares the level of the first echo-cancelled signal and the level of the second echo-cancelled signal, in the case where the level of the second echo-cancelled signal is lower than that of the first echo-cancelled signal, the selecting unit 500 provides the second echo-cancelled signal as a new second echo-cancelled signal. In the case where the level of the second echo-cancelled signal is higher than that of the first echo-cancelled signal, the selecting unit 500 provides the first echo-cancelled signal as the new second echo-cancelled signal. It is noted that the second echo replica may be generated by either the second echo replica generating unit 400 or the second echo replica generating unit 402.

The above features allow the echo cancellation apparatus 24 to select the echo-cancelled signal of the first echo-cancelled signal and the second echo-cancelled signal whichever achieves a more effective echo cancelling result than the other does so The echo cancellation technique according to Embodiment 3 is described with reference to the flowchart and expressions.

Figure 10:
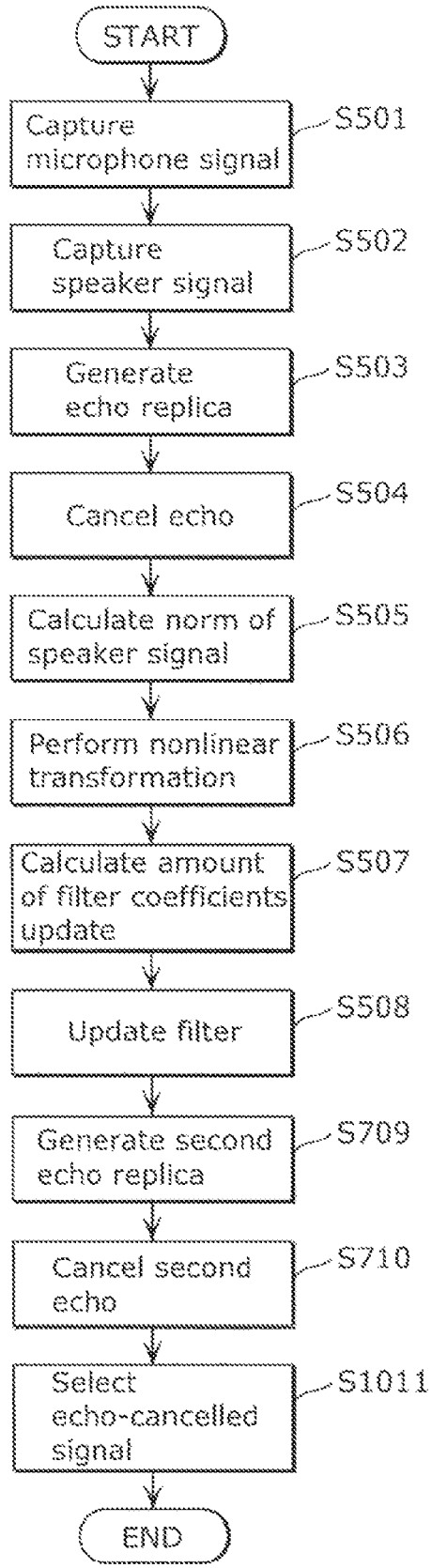
FIG. 10 depicts a flowchart showing how to cancel an echo according to Embodiment 3.

FIG. 10 depicts a flowchart showing how to cancel an echo according to Embodiment 3. The flowchart in Embodiment 3 differs from the one in Embodiment 2 in the processing after generating the second echo-cancelled signal (Step S710). Exclusively described hereinafter is the processing after the generation of the second echo-cancelled signal (Step S710).

After the second echo-cancelled signal is generated (Step S710), the selecting unit 500 selects an echo-cancelled signal (Step S1011).

Figure 11:
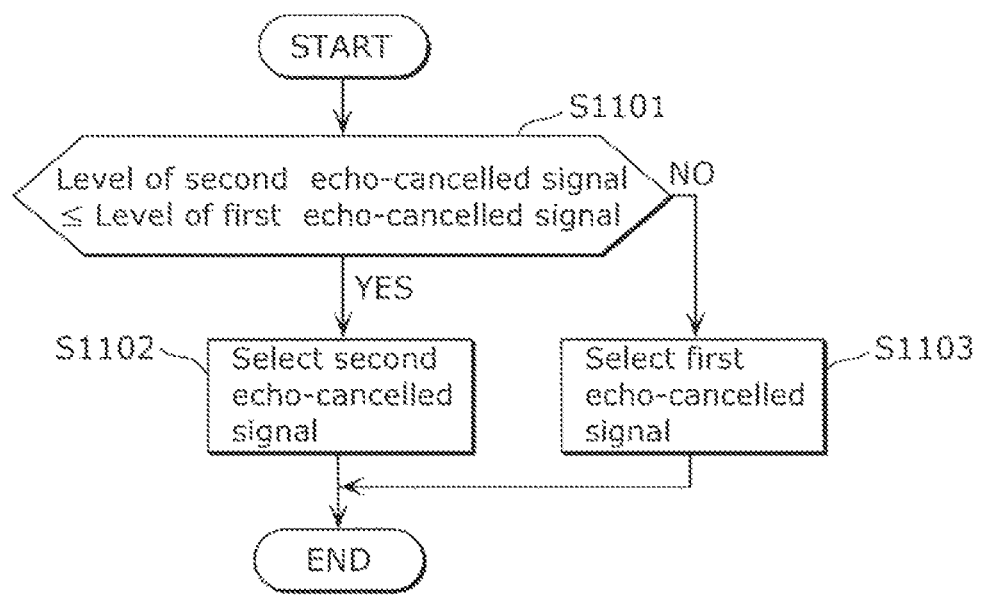
FIG. 11 depicts a flowchart showing how to select an echo-cancelled signal according to Embodiment 3.

FIG. 11 depicts a flowchart showing how to select an echo-cancelled signal according to Embodiment 3.

The selecting unit 500 compares the level of the first echo-cancelled signal obtained from Expression 4 and the level of the second echo-cancelled signal obtained from Expression 12 (Step S1101). In the case where the level of the second echo-cancelled signal is lower than that of the first echo-cancelled signal (Step S1101: Yes), the selecting unit 500 selects the second echo-cancelled signal as a new second echo-cancelled signal o3(t) (Step S1102). In the case where the level of the second echo-cancelled signal is higher than that of the first echo-cancelled signal (Step S1101 No), the selecting unit 500 selects the second echo-cancelled signal as a new second echo-cancelled signal o3(t) (Step S1103). The selecting unit 500 thus generates the new second echo-cancelled signal o3(t).

[Math. 16]

$$o_3(t) = \begin{cases} o_2(t) & \text{if } |o_2(t)| \le |o(t)| \\ o(t) & \text{otherwise} \end{cases} \quad \text{Expression 16}$$

As described above, the selecting unit 500 selects the echo-cancelled signal of the lower level out of the first echo-cancelled signal and the second echo-cancelled signal. Hence, the selecting unit 500 successfully selects an echo-cancelled signal affected by less echo.

It is noted that in the case where it is already determined before calculating the second echo-cancelled signal that the level of the second echo-cancelled signal in Expression 12 (absolute value of o2(t)) will be greater than the level of the first echo-cancelled signal (absolute value of o(t)), the second echo-cancelled signal does not have to be obtained. This is because o2(t) will be left unused in the following processing. Specifically, in the case where the levels of o(t) and z2(t) are compared with each other and a relationship of 0<z2(t)<2×o(t) holds, o2(t) does not have to be obtained. Similarly, in the case where a relationship of 2×o(t)<z2(t)<0 holds, o2(t) does not have to be obtained either.

As described above, an echo cancellation apparatus according to an implementation of the present invention can select, as an output from the echo cancellation apparatus, one of the first echo-cancelled signal and the second echo-cancelled signal whose echo is cancelled more effectively. The case when the level of the second echo-cancelled signal is higher than the level of the first echo-cancelled signal is a case when, in an operation intended to cancel an echo included in the first echo-cancelled signal, the included echo inevitably increases in contrast to the original intention. Here, the first echo-cancelled signal is more appropriate as an output from the echo cancellation apparatus.

[Embodiment 4]

Figure 12:
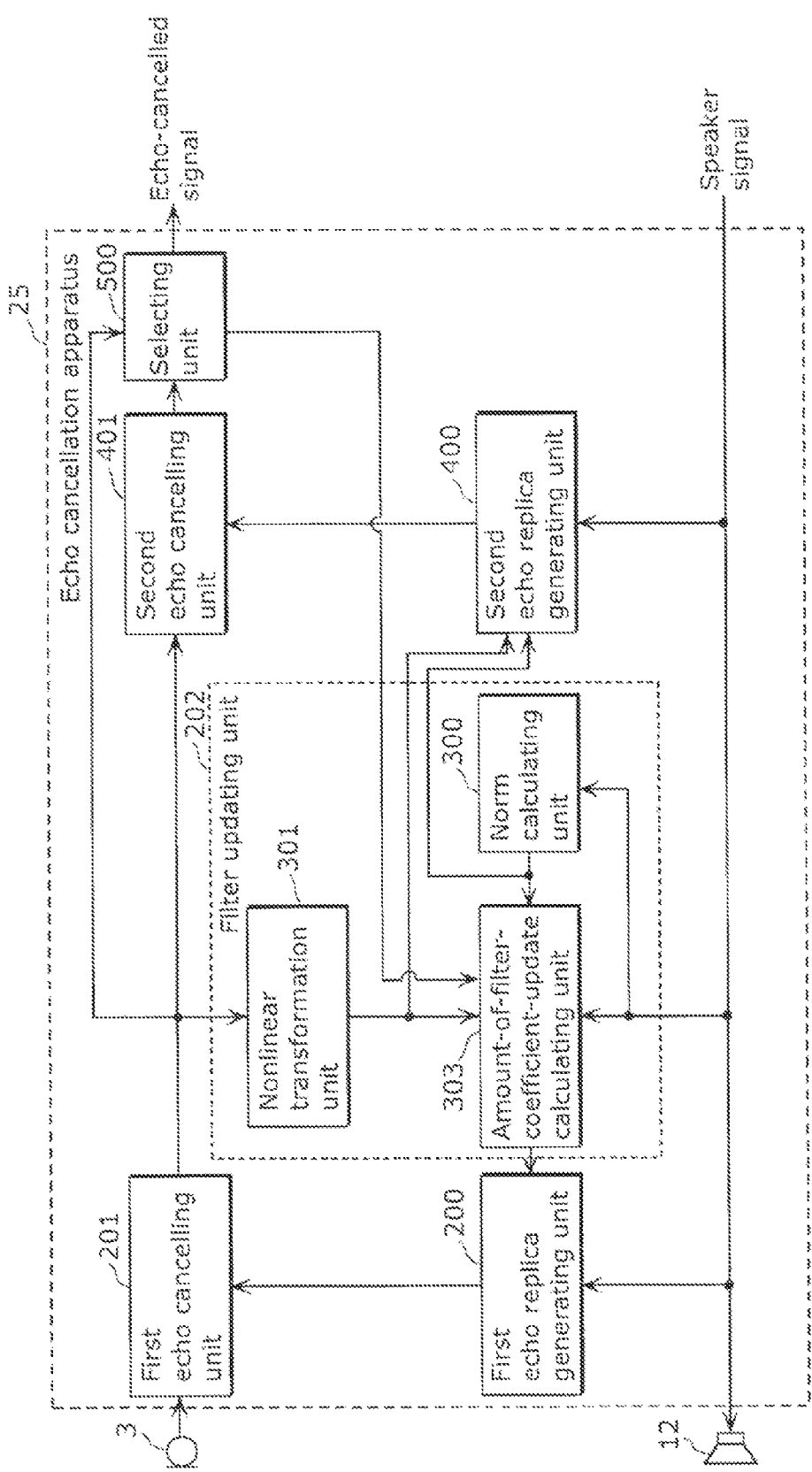
FIG. 12 shows a functional block diagram of an echo cancellation apparatus according to Embodiment 4.

FIG. 12 shows a functional block diagram of an echo cancellation apparatus 25 according to Embodiment 4. The echo cancellation apparatus 25 corresponds to the echo cancellation apparatus 20 in Embodiment 1. In FIG. 12, constituent elements identical to the ones in FIGS. 2 to 4, 6, and 9 have the same reference signs as the ones have, and the details thereof shall be omitted.

The echo cancellation apparatus 25 in FIG. 12 includes an amount-of-filter-coefficient-update calculating unit 303.

The amount-of-filter-coefficient-update calculating unit 303 compares the first echo-cancelled signal and the second echo-cancelled signal. In the case where the level of the second echo-cancelled signal is higher than that of the first echo-cancelled signal, the amount-of-filter-coefficient-update calculating unit 303 leaves a filter un-updated. In the case where the level of the second echo-cancelled signal is lower than that of the first echo-cancelled signal, the amount-of-filter-coefficient-update calculating unit 303 calculates an amount of filter coefficients update using the norm calculated by the norm calculating unit 300, a first echo-cancelled signal, and a speaker signal, and updates the filter using the calculated update amount. It is noted that a second echo replica may be generated by either the second echo replica generating unit 400 or the second echo replica generating unit 402.

The echo cancellation technique according to Embodiment 4 is described with reference to the flowchart and expressions. The flowchart in Embodiment 4 differs from the one in Embodiment 3 in the processing after calculating the norm of the speaker signal (Step S506). Exclusively described hereinafter is the processing after calculating the norm of the speaker signal (Step S506).

Figure 14:
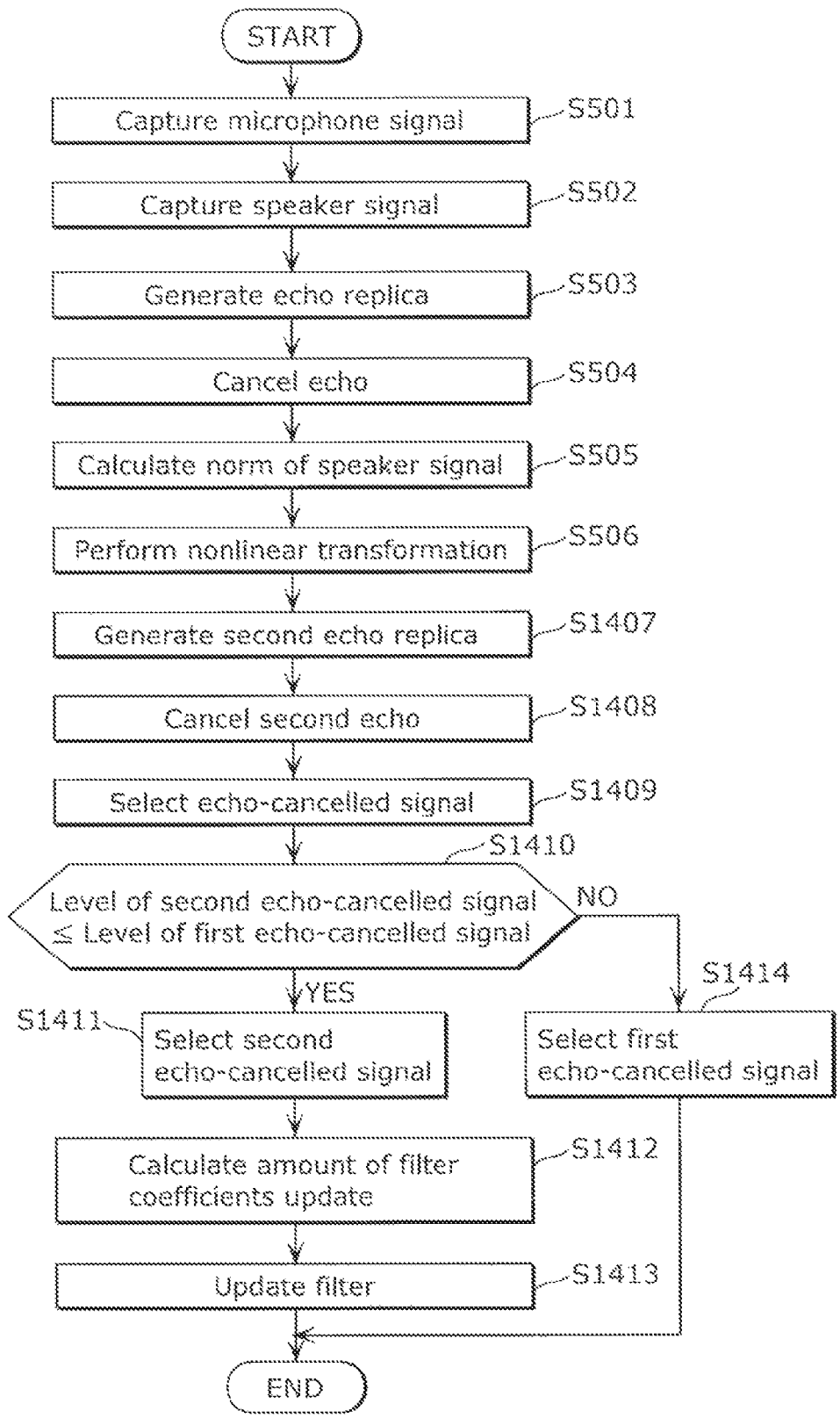
FIG. 14 depicts a flowchart showing how to cancel an echo according to Embodiment 4.

FIG. 14 depicts a flowchart showing how to cancel an echo according to Embodiment 4.

After the norm of the speaker signal is calculated (Step S506), the echo cancellation apparatus 25 generates a second pseudo echo (Step S1407), generates a second echo-cancelled signal (Step S1408), and selects an echo-cancelled signal (Step S1409). The Steps S1407, S1408, and S1409 are respectively the same as the Steps S709, S710, and S1011.

The selecting unit 500 next compares the level of the first echo-cancelled signal obtained from Expression 4 and that of the second echo-cancelled signal obtained from Expression 12 (Step S1410).

When the comparison result in Step S1410 shows that in the case where the level of the second echo-cancelled signal is higher than that of the first echo-cancelled signal (Step S1401: No), the selecting unit 500 provides the second echo-cancelled signal as a new second echo-cancelled signal (Step S1414). Here, the amount-of-filter-coefficient-update calculating unit 303 leaves the filter un-updated.

When the comparison result in Step S1410 shows that in the case where the level of the second echo-cancelled signal is lower than that of the first echo-cancelled signal (Step S1401: Yes), the selecting unit 500 provides the first echo-cancelled signal as the new second echo-cancelled signal (Step S1411). The amount-of-filter-coefficient-update calculating unit 303 calculates an update amount of a filter (Step S1412), and updates the filter (Step S1413).

In Embodiment 4, the case when the level of the second echo-cancelled signal is higher than the level of the first echo-cancelled signal is a case when, in a filter update operation intended to generate a first pseudo echo, the filter is updated so that the level of the echo-cancelled signal inevitably increases in contrast to the original intention. Here, it is more appropriate not to update the filter. Moreover, the filter update determination is made based on the comparison between the level of the first echo-cancelled signal and that of the second echo-cancelled signal. Hence the amount of filter coefficients update is not used for the determination. Such a feature allows the filter update determination to be made before calculating the amount of filter coefficients update, which contributes to reducing an amount of operations executed by the echo cancellation apparatus.

[Modification of Embodiment 4]

Figure 13:
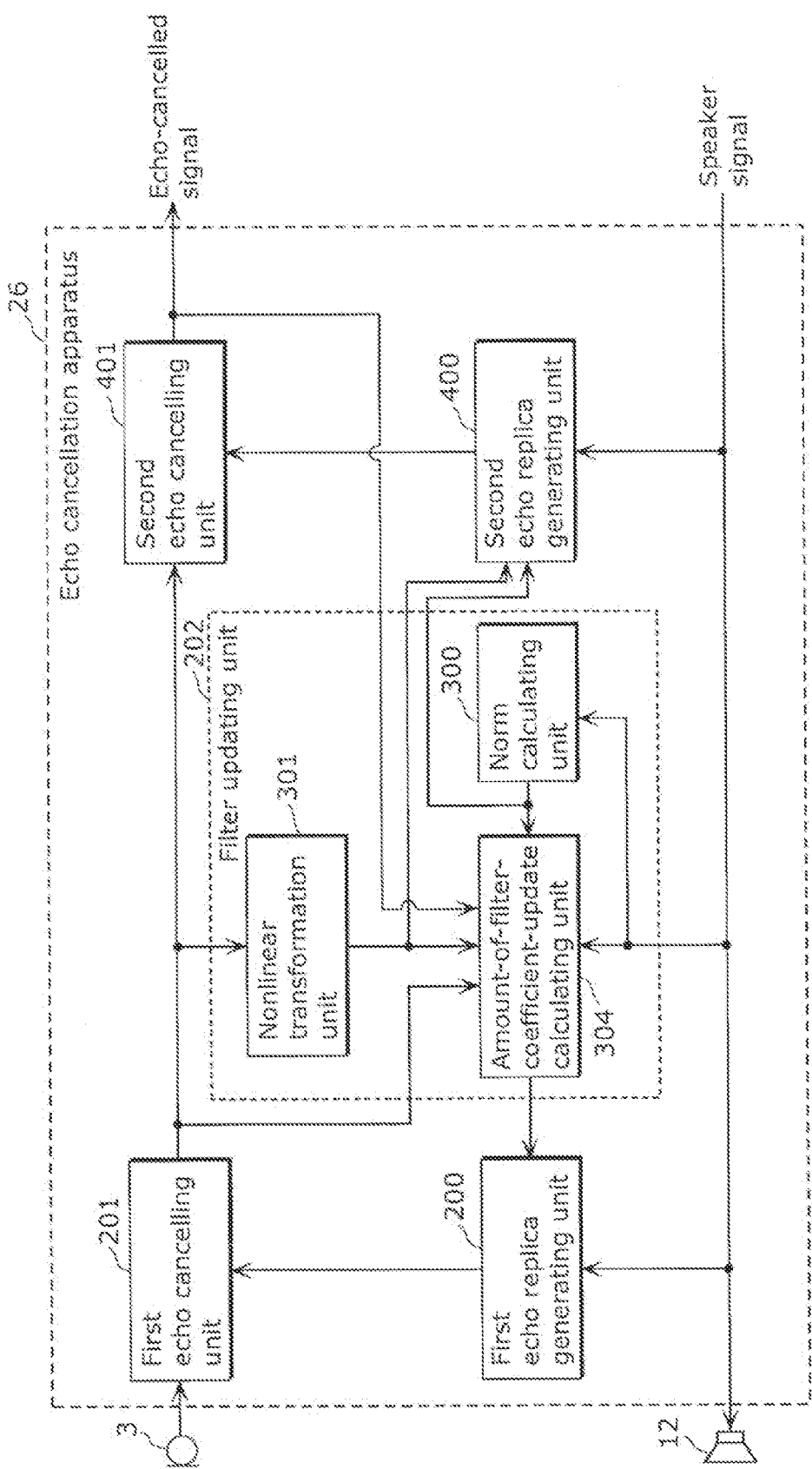
FIG. 13 shows a functional block diagram of an echo cancellation apparatus according to Modification in Embodiment 4.

FIG. 13 shows a functional block diagram of an echo cancellation apparatus according to Modification in Embodiment 4. In Embodiment 4, the selecting unit 500 determines whether or not a filter is to be updated or left un-updated using the level of an echo-cancelled signal. In Modification, it is an amount-of-filter-coefficient-update calculating unit 304 that implements an operation similar to the above determination in Embodiment 4, using a first echo-cancelled signal, a second echo-cancelled signal, and a nonlinear-converted echo-cancelled signal.

Such a feature allows the amount-of-filter-coefficient-update calculating unit 304 to compare the level of the echo-cancelled signal and that of the second echo-cancelled signal to determine whether or not a calculated update amount of a filter is equalized with an echo acoustic transfer function. This eliminates the need of unnecessary updates. Consequently, an improvement is seen in the convergence rate for equalizing the filter characteristic with the echo acoustic transfer function, and the filter can be further equalized with the echo acoustic transfer function.

In the echo cancellation apparatus according to an implementation of the present invention, the case when the level of the second echo-cancelled signal is higher than the level of the first echo-cancelled signal is a case when, in a filter update operation intended to generate a first pseudo echo, the filter is updated so that the level of the echo-cancelled signal inevitably increases in contrast to the original intention. In such a case, the filter is left un-updated so that the filter characteristic is stably equalized with the echo acoustic transfer function, and the echo can be cancelled more precisely. Moreover, the amount of operations that the echo cancellation apparatus handles can be reduced when the level of the second echo-cancelled signal is higher than the level of the first echo-cancelled signal. The filter update determination is made based on the comparison between the level of the first echo-cancelled signal and that of the second echo-cancelled signal. The reduction of the amount of operations can be achieved because the amount of filter coefficients update is not used in the determination.

It is noted that, in the above embodiments, each of the constituent elements may be implemented in a form of dedicated hardware. The constituent elements may also be implemented through execution of a software program suitable to each constituent element. Each of the constituent elements may be implemented as a program executing unit, such as a CPU and a processor, which reads out and executes a software program recorded on a recording medium including a hard disc or a semiconductor memory. Here, the program below may be the software that works as an echo cancellation apparatus according to each embodiment.

In other words, the program causes a computer to execute an echo cancelling method for generating and providing an echo-cancelled signal in which an echo signal is cancelled, the echo signal being (i) generated when a amplified sound of a first speech signal is received and (ii) included in a second speech signal, and the echo-cancelled signal being generated of the second speech signal with the echo signal cancelled. The echo cancellation method includes: generating a first echo replica by processing the first speech signal through a filter whose characteristic is equalized with a acoustic transfer function, of the amplified sound, found until the amplified sound is received; generating and providing a first echo-cancelled signal by subtracting from the second speech signal the first echo replica generated in the generating the first echo replica; and generating a nonlinear-converted echo-cancelled signal by performing nonlinear conversion on the first echo-cancelled signal generated in the generating and providing, and updating the filter characteristic thereby equalizing the filter characteristic with the acoustic transfer function, using the nonlinear-converted echo-cancelled signal, the first speech signal, and a norm of the first speech signal.

Moreover, the program causes the computer to execute generating a second echo replica, using the norm of the first speech signals, the nonlinear-converted echo-cancelled signal, and the first speech signal; and generating and providing a second echo-cancelled signal by subtracting from the first echo-cancelled signal the second echo replica generated in the generating the second echo replica.

Although only some exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

INDUSTRIAL APPLICABILITY

An echo cancellation apparatus and an echo cancellation method according to an implementation of the present invention and a communications apparatus equipped with the echo cancellation apparatus can equalize an echo acoustic transfer function and a filter characteristic between a speaker and a microphone even in doubletalk in which user speech and an echo present simultaneously. Hence, the echo cancellation apparatus, the echo cancellation method, and the communications apparatus are useful as a teleconference system, an audio conference system, a hands-free phone, and Web conference services. Other than the above applications, the echo cancellation apparatus, the echo cancellation method, and the communications apparatus are also applicable as a technique to cancel an echo which develops when audio amplified by a speaker enters a microphone.

REFERENCE SIGNS LIST

1 Teleconference system
2 Video conference terminal
3 Microphone
4 Camera
5 The Internet
6 Speech ADC
7 Video ADC
8 Encoder
9 Decoder
10 Speech DAC
11 Video DAC
12 Speaker
13 Display
14 Communications unit
20 to 26 Echo cancellation apparatus
100 Microphone signal capturing unit
101 Speaker signal capturing unit
200 First echo replica generating unit
201 First echo cancelling unit
202 Filter updating unit
300 Norm calculating unit
301 Nonlinear transformation unit
302 to 304 Amount-of-filter-coefficient-update calculating unit
400 and 402 Second echo replica generating unit
401 Second echo cancelling unit
500 Selecting unit

The invention claimed is:
1. An echo cancellation apparatus which generates and provides an echo-cancelled signal in which an echo signal is cancelled, the echo signal being (i) generated when an amplified sound of a first speech signal is received and (ii) included in a second speech signal, and the echo-cancelled signal being generated from the second speech signal with the echo signal cancelled, the echo cancellation apparatus comprising:
a first echo replica generating unit configured to generate a first echo replica by processing the first speech signal through a filter whose characteristic is equalized with an acoustic transfer function, of the amplified sound, found until the amplified sound is received;
a first echo cancelling unit configured to generate a first echo-cancelled signal by subtracting from the second speech signal the first echo replica generated by the first echo replica generating unit, and provide the first echo-cancelled signal; and
a filter updating unit configured to (i) generate a nonlinear-converted echo-cancelled signal by performing nonlinear conversion on the first echo-cancelled signal generated by the first echo cancelling unit, and (ii) update the filter characteristic thereby equalizing the filter characteristic with the acoustic transfer function, using the nonlinear-converted echo-cancelled signal, the first speech signal, and a Lebesgue space 1 (L-1) norm of the first speech signal, wherein the filter updating unit is configured to update the filter characteristic, using a ratio of the first speech signal to the L-1 norm of the first speech signal, and the nonlinear-converted echo-cancelled signal.

2. The echo cancellation apparatus according to claim 1, wherein the filter updating unit is configured to update the filter characteristic, by adding, to the filter characteristic before update, a product of the ratio of the first speech signal to the L-1 norm of the first speech signal, the nonlinear-converted echo-cancelled signal, and a predetermined coefficient.

3. The echo cancellation apparatus according to claim 1, wherein the filter updating unit is configured to perform the nonlinear conversion, using a sign function which takes +1 when the first echo-cancelled signal is positive, −1 when the first echo-cancelled signal is negative, and 0 when the first echo-cancelled signal is zero.

4. The echo cancellation apparatus according to claim 1, further comprising:
a second echo replica generating unit configured to generate a second echo replica, using the L-1 norm of the first speech signal and the nonlinear-converted echo-cancelled signal; and
a second echo cancelling unit configured to generate a second echo-cancelled signal by subtracting from the first echo-cancelled signal the second echo replica generated by the second echo replica generating unit, and provide the second echo-cancelled signal.

5. The echo cancellation apparatus according to claim 4, further comprising
a selecting unit configured to provide (i) the second echo-cancelled signal as a new second echo-cancelled signal in the case where a level of the second echo-cancelled signal is lower than a level of the first echo-cancelled signal, and (ii) the first echo-cancelled signal as the new second echo-cancelled signal in the case where the level of the second echo-cancelled signal is higher than the level of the first echo-cancelled signal.

6. The echo cancellation apparatus according to claim 5, wherein the filter updating unit is configured to leave the filter characteristic un-updated in the case where the selecting unit provides the first echo-cancelled signal as the new second echo-cancelled signal.

7. The echo cancellation apparatus according to claim 1, further comprising:
a second echo replica generating unit configured to generate a second echo replica, using the L-1 norm of the first speech signal, the nonlinear-converted echo-cancelled signal, and the first speech signal; and
a second echo cancelling unit configured to generate a second echo-cancelled signal by subtracting from the first echo-cancelled signal the second echo replica generated by the second echo replica generating unit, and provide the second echo-cancelled signal.

8. The echo cancellation apparatus according to claim 1, wherein the filter updating unit is configured to calculate, for obtaining the second echo replica, a sum of squares of levels of the first speech signal within a predetermined time period of a past.

9. A communications apparatus comprising:
the echo cancellation apparatus according to claim 1,
a microphone which receives speech in a surrounding, thereby generating a speech signal;
a speaker which amplifies speech based on a speech signal;
a communications unit configured to transmit a speech signal to a far-end user and receive a speech signal from the far-end user,
wherein the echo cancellation apparatus: receives (i) the speech signal received by the communications unit from the far-end user as the first speech signal and (ii) the speech signal generated by the microphone as the second speech signal; and provides one of the first echo-cancelled signal and the second echo-cancelled signal to the communications unit as a speech signal to be transmitted to the far-end user.

10. An echo cancellation method for generating and providing an echo-cancelled signal in which an echo signal is cancelled, the echo signal being (i) generated when an amplified sound of a first speech signal is received and (ii) included in a second speech signal, and the echo-cancelled signal being generated from the second speech signal with the echo signal cancelled, the echo cancellation method comprising:
generating a first echo replica by processing the first speech signal through a filter whose characteristic is equalized with an acoustic transfer function, of the amplified sound, found until the amplified sound is received;
generating and providing a first echo-cancelled signal by subtracting from the second speech signal the first echo replica generated in the generating the first echo replica;
generating a nonlinear-converted echo-cancelled signal by performing nonlinear conversion on the first echo-cancelled signal generated in the generating and providing; and
updating the filter characteristic thereby equalizing the filter characteristic with the acoustic transfer function, using the nonlinear-converted echo-cancelled signal, the first speech signal, and a Lebesgue space 1 (L-1) norm of the first speech signal,
wherein in the updating, the filter characteristic is updated using a ratio of the first speech signal to the L-1 norm of the first speech signal, and the nonlinear-converted echo-cancelled signal.

11. The echo cancellation method according to claim 10, further comprising:
generating a second echo replica, using the L-1 norm of the first speech signals, the nonlinear-converted echo-cancelled signal, and the first speech signal; and
generating and providing a second echo-cancelled signal by subtracting from the first echo-cancelled signal the second echo replica generated in the generating the second echo replica.

12. A non-transitory computer-readable recording medium for use in a computer, the recording medium having a computer program recorded thereon for causing the computer to execute the echo cancellation method according to claim 11.

13. A non-transitory computer-readable recording medium for use in a computer, the recording medium having a computer program recorded thereon for causing the computer to execute the echo cancellation method according to claim 10.

* * * * *